US012679059B2

(12) United States Patent
Seruntine et al.

(10) Patent No.: US 12,679,059 B2
(45) Date of Patent: Jul. 14, 2026

(54) WIND TURBINE BLADE WITH A FAIRING

(71) Applicant: LM WIND POWER A/S, Kolding (DK)

(72) Inventors: Nicholas Seruntine, New Orleans, LA (US); Christian Ibsen, Kolding (DK); Evan Quincy, New Orleans, LA (US); Tomas Muchenik Cena, New Orleans, LA (US)

(73) Assignee: LM Wind Power A/S, Kolding (DK)

( * ) Notice: Subject to any disclaimer, the term of this patent is extended or adjusted under 35 U.S.C. 154(b) by 223 days.

(21) Appl. No.: 18/276,716

(22) PCT Filed: Apr. 4, 2022

(86) PCT No.: PCT/EP2022/058861
§ 371 (c)(1),
(2) Date: Aug. 10, 2023

(87) PCT Pub. No.: WO2022/214427
PCT Pub. Date: Oct. 13, 2022

(65) Prior Publication Data
US 2024/0100794 A1 Mar. 28, 2024

(30) Foreign Application Priority Data
Apr. 9, 2021 (EP) ..................................... 21167693

(51) Int. Cl.
*B29D 99/00* (2010.01)
*F03D 1/06* (2006.01)

(52) U.S. Cl.
CPC ....... *B29D 99/0028* (2013.01); *F03D 1/0675* (2013.01); *F05B 2230/604* (2013.01)

(58) Field of Classification Search
CPC .... F03D 1/0633; F03D 1/0643; F03D 1/0645; F03D 1/0675; F05B 2240/303; F05B 2240/304; B29D 99/0028; B29L 2031/085
See application file for complete search history.

(56) References Cited

U.S. PATENT DOCUMENTS 8,012,299 B2 * 9/2011 Hancock ............... F03D 1/0675
29/889.7
8,047,799 B2 * 11/2011 Nies ...................... F03D 1/0675
416/232

(Continued)

FOREIGN PATENT DOCUMENTS

WO    2009109619 A2    9/2009
WO    2020216422 A1    10/2020

*Primary Examiner* — Sang K Kim
(74) *Attorney, Agent, or Firm* — Dority & Manning, P.A.

(57) ABSTRACT

A prefabricated fairing for a wind turbine blade comprising fairing lips and exterior and interior fairing surfaces, wherein the fairing has a first fairing state in which the fairing is adapted to be mounted to a blade body of the wind turbine blade and a second fairing state in which the fairing is adapted to be fixed to the blade body, the fairing lips being compressed towards each other in the second fairing state relative to the first fairing state, wherein the fairing is brought from the first fairing state to the second fairing state upon application of a compression force onto the exterior fairing surface at fairing lips, wherein a difference between a first fairing lip distance in the first fairing state and a second fairing lip distance in the second fairing state is equal to or greater than 5 mm.

16 Claims, 14 Drawing Sheets

(56)  References Cited

U.S. PATENT DOCUMENTS

| | | | |
|---|---|---|---|
| 11,480,157 B2* | 10/2022 | Lindskog | F03D 80/40 |
| 11,976,626 B2* | 5/2024 | Haag | F03D 1/0675 |
| 12,215,667 B2* | 2/2025 | Seruntine | F03D 1/0675 |
| 2007/0036659 A1* | 2/2007 | Hibbard | B29C 66/303 |
| | | | 416/233 |
| 2013/0045105 A1* | 2/2013 | Driver | F03D 1/0675 |
| | | | 29/889.7 |
| 2021/0062784 A1* | 3/2021 | Tangager | F03D 13/10 |
| 2021/0207576 A1* | 7/2021 | Larsen | F03D 80/50 |
| 2023/0265828 A1* | 8/2023 | Mukherjee | F03D 1/0688 |
| | | | 416/241 R |
| 2024/0286327 A1* | 8/2024 | Smith | B29D 99/0028 |
| 2025/0001447 A1* | 1/2025 | Jensen | B05C 5/027 |

* cited by examiner

WIND TURBINE BLADE WITH A FAIRING

This is a National Phase Application filed under 35 U.S.C. 371 as a national stage of PCT/EP2022/058861, filed Apr. 4, 2022, an application claiming the benefit of European Application No. 21167693.7, filed Apr. 9, 2021, the content of each of which is hereby incorporated by reference in its entirety.

TECHNICAL FIELD

The present disclosure relates to a prefabricated fairing for a wind turbine blade, a method of assembling a wind turbine blade with such a fairing, a method of manufacturing such a fairing, and a kit of parts for assembling a wind turbine blade.

BACKGROUND

Wind is an increasingly popular clean source of renewable energy with no air or water pollution. When the wind blows, wind turbine blades spin clockwise, capturing energy through a main shaft connected to a gearbox and a generator for producing electricity. Blades of modern wind turbines are carefully designed to maximise efficiency. Modern wind turbine blades may exceed 80 metres in length and 4 metres in width.

Wind turbine blades are typically made from a fibre-reinforced polymer material, comprising a pressure side shell half and a suction side shell half, also called blade halves. The cross-sectional profile of a typical wind turbine blade includes an airfoil for creating an air flow leading to a pressure difference between both sides. The resulting lift force generates torque for producing electricity.

As wind turbines increase in size, so do wind turbine blade lengths, resulting in faster tip speeds typically in the range of 75 to 100 metres per second for three-bladed wind turbines. For some two-bladed turbines, the blades can rotate with a tip speed as high as 130 metres per second. This causes very severe erosion conditions at the tip of the blade as well as along the outer third of the leading edge, leading to blade damage in these areas due to the continued impact from wind, rain, hail, sand and/or airborne particles. Such erosive processes can limit the maximum rotational speed of the blades, hence potentially reducing the power output of the wind turbine. These effects are exacerbated by the fact that wind turbines are increasingly subjected to harsh environmental conditions, such as remote offshore sites, mountain regions or challenging climates.

Although wind turbine blades are typically expected to last for 20 years, this is often not the case due to the damage caused by erosion of the leading edge necessitating blade repair. Thus, during the lifetime of a wind turbine, considerable resources are expended on continued maintenance operations to ensure optimum turbine performance. However, repair of the leading edge is not easy since it is typically carried out with the blade still erected on the turbine. This also has significant cost and safety implications, particularly if the wind turbine is located offshore. Leading edge erosion may therefore result in reduced annual energy production and increased need for maintenance and repairs.

Today, most wind turbine blades have a joint bonded during manufacturing at the leading edge which is the most aerodynamically sensitive area, especially the outer third of the wind turbine blade. Such a joint introduces both shape irregularities, which degrade performance, and material boundaries which reduce erosion resistance.

In order to reduce the damage caused by erosion, it is known to provide a leading-edge protection, such as an erosion shield, at the leading edge of a wind turbine blade. A plurality of different types of shields made from different material exist.

Some prior art solutions attempt to protect the leading edge of a wind turbine blade using a layer, e.g. a paint or a coating, of erosion-resistant material which is applied along the length of the blade covering the leading edge. Such coatings can be applied in-mould or post-mould. Although erosion resistance is increased in the area to which the layer is applied, the protection provided by a specialist paint coating will diminish over time and will not last for the expected wind turbine blade design life of 20 years without maintenance. Furthermore, such solutions, which are painted on the leading edge and polymerize in situ, vary in thickness. Thus, the aerodynamic profile accuracy and performance is decreased. Also, polymer films may be difficult to apply and/or bond to the blade surface and thus require a specialist.

It is also known to apply a protective layer of thermoplastic film as a thin tape over the leading edge of a wind turbine blade with a layer of pressure-sensitive adhesive. Such films offer good erosion resistance but are difficult to apply. Further, the quality of the bond between the thermoplastic film and the leading edge is not optimal.

Another known way of addressing these challenges is the implementation of leading-edge protection caps typically having a metallic leading edge. Some of these installations, however, lead to an undesired increase in the mass of the blade tip, thus raising loads on the rest of the blade and on the turbine. In addition, as the size of the blades increases, the size of the protective device must also increase. Such large and thick devices tend to be particularly susceptible to cracking due to mechanical impact and vibrations during the operation of the wind turbine. Thus, existing protection solutions are susceptible to defects and poor adhesion, potentially raising operation and maintenance cost substantially.

Furthermore, mounting of such leading-edge protection cap typically requires manual placement by skilled workers as slight mounting misalignments risk causing reduced annual energy production and shorter life spans. However, as the length of wind turbine blades increases so does the length of the leading-edge protection caps who become increasingly unwieldy.

SUMMARY

On this background, it may be seen as an object of the present disclosure to provide a method of assembling a kit of wind turbine blade parts comprising a structural blade body and a fairing with increased precision and reduced need for manual labour.

Another object of the present disclosure is to provide a fairing for a wind turbine blade that is easier to mount precisely and has reduced need for manual labour.

One or more of these objects may be met by aspects of the present disclosure as described in the following.

A first aspect of this disclosure relates to a method of assembling a wind turbine blade extending along a longitudinal axis from a root to a tip, the wind turbine blade comprising a root region and an airfoil region with the tip, the wind turbine blade comprising a chord line extending between a leading edge and a trailing edge, the wind turbine blade comprising an aerodynamic exterior blade surface including a pressure side and a suction side, the method comprising the steps of:

providing a prefabricated structural blade body comprising:

a first exterior body surface defining part of the pressure side, a second exterior body surface defining part of the suction side, a first attachment surface located adjacent to the first exterior body surface, and a second attachment surface located adjacent to the second exterior body surface;

separately providing a prefabricated fairing extending along the longitudinal axis, the fairing extends along a fairing profile terminating at a first fairing lip of the fairing and at a second fairing lip of the fairing, the fairing comprising:

an exterior fairing surface positioned exteriorly relative to the fairing profile, an interior fairing surface positioned interiorly relative to the fairing profile, and one or more fibre-reinforced layers extending from the first fairing lip to the second fairing lip and along the longitudinal axis, wherein the fairing has a first fairing state and a second fairing state, wherein the fairing lips are forced toward each other in the second fairing state relative to the first fairing state;

while the fairing is in the first fairing state, arranging the fairing so that the interior fairing surface faces the attachment surfaces of the blade body and gaps are present respectively between the first attachment surface of the blade body and the first fairing lip of the fairing and between the second attachment surface of the blade body and the second fairing lip of the fairing;

applying a compression force onto the fairing lips, e.g. onto the exterior fairing surface at the fairing lips, to deform the one or more fibre-reinforced layers of the fairing from the first fairing state to the second fairing state so that the first fairing lip and the first attachment surface are brought into contact with a first adhesive and so that the second fairing lip and the second attachment surface are brought into contact with a second adhesive;

while maintaining the compression force, curing the first and second adhesives to fix the fairing in its second fairing state to the blade body so that the exterior fairing surface defines a part of the exterior blade surface arranged flush with the first exterior body surface and the second exterior body surface and so that the exterior fairing surface defines either the leading edge of the wind turbine blade or the trailing edge of the wind turbine blade; and optionally relieving the compression force on the exterior fairing surface.

By arranging the fairing on the blade body while the fairing is in the first fairing state, it can be avoided that adhesive is scraped off when the fairing lips are placed adjacent to the attachment surfaces since the distance between the fairing lips is greater than the distance between the attachment surfaces of the blade body. Thus, an improved adhesion may be achieved.

Furthermore, such a method allows adjustments of the fairing relative to the blade body when the fairing is in the first fairing state, since the fairing lips are only brought in contact with the adhesive when the fairing is in the second fairing state.

In this disclosure, the term "fairing" may be understood as an external structure added to a structural blade body of the wind turbine blade exposed to the air stream and with the purpose of altering the air stream around the wind turbine blade.

The fairing may form part of an aerodynamic fairing, a premanufactured device in the form of a shield, a protector, and/or a cap.

Preferably, the fairing is a leading-edge protection fairing for defining the leading edge of the wind turbine blade.

In this disclosure, the term "structural blade body" may be understood as the main load carrying structure of the wind turbine blade which also comprises a majority of the external aerodynamic blade surface and together with the fairing defines the wind turbine blade.

The fairing profile may define the centre line of each cross-section of the fairing along the longitudinal axis, e.g. the interior fairing surface and the exterior fairing surface may be arranged equidistant from the fairing profile.

The structural blade body may comprise a third exterior body surface extending between the attachment surfaces opposite of the first and second exterior body surfaces. The fairing may be arranged with a spacing between the interior fairing surface and at least a portion of or a majority of or the entire of the third exterior body surface of the structural blade body.

Additionally, or alternatively, the exterior fairing surface is single- or double-curved plate-shaped.

Additionally, or alternatively, the step of arranging the fairing may comprise arranging both the blade body and the fairing so that the chord arranged vertically and subsequently reducing the distance between the blade body and the fairing until the attachment surfaces of the blade body are covered and/or face the interior fairing surface.

In the context of the present disclosure, the exterior fairing surface and the exterior body surfaces are arranged substantially flush if a step-down from the exterior fairing surface to any of the exterior body surfaces does not exceed 0.5 mm and if a step-up from the exterior fairing surface to any of the exterior body surfaces does not exceed 0.2 mm. A step-up or step-down from the exterior fairing surface to any of the exterior body surfaces has a direct and major influence on the annual energy production of the wind turbine blade and is therefore considered being very critical.

Additionally, or alternatively, the fairing may further have a relaxed fairing state in which the fairing is relaxed and wherein the fairing lips are expanded away from each other in the first and second fairing states relative to the relaxed fairing state.

By ensuring that the fairing is stressed in both the first and second fairing states, a spring back force by the fairing can be achieved to ensure that the fairing is biased towards the adhesive once the expansion force is released. Advantageously, a good adhesive contact is achieved.

Alternatively, the fairing may be relaxed in the second fairing state. Alternatively, the fairing may be relaxed in the first fairing state.

Additionally, or alternatively, the method may further comprise the steps of:

providing a jig extending along the longitudinal axis and along a jig profile terminating at a first jig lip of the jig and at a second jig lip of the jig and corresponding in shape to the fairing profile, the jig further comprising an interior jig surface positioned interiorly relative to the jig profile and matching the exterior fairing surface of the fairing wherein the jig has a first jig state and a second jig state, wherein the jig profile in the first jig state matches the fairing profile in the first fairing state and the jig profile in the second jig state matches the fairing profile in the second fairing state.

Additionally or alternatively, the method may comprise performing, prior to the step of arranging the fairing, the sub-steps of:

applying an expansion force on the jig lips to expand jig lips of the jig;

positioning the fairing, preferably being in the relaxed fairing state, in the jig so that the exterior fairing surface contacts the interior jig surface; and releasing the expansion force until the jig and the fairing are deformed to the first jig state and the first fairing state, respectively;

wherein the compression force is applied onto the exterior fairing surface at the fairing lips so that the jig and the fairing are deformed to the second jig state and the second fairing state, respectively.

Handling the jig instead of the fairing may reduce risk of damage to the fairing and may ensure that the fairing, which may be a relatively dimensionally unstable part before being attached to the blade body, is kept in a stable state.

Advantageously, by arranging the fairing profile compressed in the first fairing state relative to the relaxed jig state and the jig profile expanded in the second jig state relative to the relaxed jig state, good contact between the interior jig surface and the interior fairing surface is achieved both in the first states, and in the second states, as the fairing will attempt to revert to its relaxed fairing state while the jig will attempt to revert in the opposite direction to its relaxed jig state. This allows the jig to retain, e.g. frictionally, the fairing in both states.

Preferably, the fairing may be made of a resilient material, preferably a fibre-reinforced material, preferably being less stiff than the material of the blade body.

Additionally, or alternatively, the jig may have a relaxed jig state and wherein the jig lips may be expanded in the first jig state and second jig state relative to the relaxed jig state, wherein the step of applying the compression force may at least partly, preferably entirely, be achieved by a spring back force of the jig upon releasing the expansion force on the jig lips.

Additionally or alternatively, the compression force may at least partly be applied by inflating one or more bladders, preferably including a first bladder and a second bladder. Preferably, the one or more bladders may form part of the jig. Preferably, the jig may comprise a base part and the first bladder may be arranged between the first jig lip and the base part, and the second bladder may be arranged between the second jig lip and the base part. The base part may be rigid compared to the jig lips so that when the bladders are inflated, the base part retains its original geometry while the jig lips are forced towards each other. Preferably, the fairing and jig are relaxed in the first fairing state and first jig state, respectively.

Additionally, or alternatively, the method may further comprise a step of:

providing one or more clamping tool sets, wherein each clamping tool set comprises:

a first clamping tool having a first clamping head and being secured to the blade body adjacent to one of the attachment surfaces, and preferably a second clamping tool having a second clamping head and being secured to the blade body adjacent to the other one of the attachment surfaces, wherein the step of applying the compression force is at least partly, preferably entirely, achieved by actuating the clamping tools of each clamping tool set to urge the clamping heads to apply the compression force onto the fairing via the exterior jig surface.

Additionally, or alternatively, the clamping tools may be pneumatically actuated, hydraulically actuated, lever actuated, electrically actuated, and/or spring actuated.

Additionally, or alternatively, the compression force may be applied by both the spring-back of the jig and the one or more clamping tool sets.

Additionally, or alternatively, the method may further comprise a step of:

arranging a force distribution element between each clamping head and the respective fairing lip, the load distribution element extending along the longitudinal axis and being configured to distribute the clamping force applied by the respective clamping head on the exterior jig surface.

Additionally, or alternatively, a plurality of clamping tool set may be distributed along the longitudinal axis, preferably spaced 1-3 metres apart, more preferably spaced 2 metres apart.

It is also possible to use other means for applying the force to the fairing, such as using a pressure hose or other distributed pressure means.

Additionally, or alternatively, the method may further comprise a step of:

providing one or more alignment tool sets, wherein each alignment tool sets comprises:

a first tool pair including a first jig tool part secured to one of the fairing lips or jig lips, and a first blade tool part secured to the blade body or the fixture lip adjacent to the corresponding attachment surface, and preferably a second tool pair including a second jig tool part secured to the other fairing lip or jig lip, and a second blade tool part secured to the blade body or other fixture lip adjacent to the corresponding other attachment surface, respectively, wherein one of the tool parts of each tool pair comprises a pin and the other one of the tool parts of each tool pair comprises a guide, the guide being configured for retaining the respective pin while allowing the pin to move along a predefined guide course from a pin entry position to a pin terminal position, and wherein the step of arranging the fairing comprises inserting each pin in the respective guide to the pin entry position to bring the fairing to the first fairing state, each pin being retained in the respective guide, and wherein the step of applying the compression force causes each pin to move from the pin entry position to the pin terminal position of the respective guide.

Additionally, or alternatively, the expansion force may be applied by pulling the jig tool parts of each alignment tool set apart.

Additionally, or alternatively, the tool part comprising the guide may further comprise a retention latch having an open position and a closed position, wherein the retention latch, when in the open position, allows receival of the pin in the guide and, when in the closed position, prevents removal of the pin from the guide. The retention latch may be pivotally attached to the associated tool part and may be configured to pivot between the open and closed position.

Additionally, or alternatively, wherein the guide of each tool pair may comprise a sloping section between a pin entry position and the first pin position, wherein the step of inserting each pin in the respective guide may comprise sliding each pin along the sloping section of the respective guide from the pin entry position to the first pin position to gradually increase the expansion force on the jig lips.

Additionally, or alternatively, the method may further comprise a step of:

providing a fixture comprising a fixture profile terminating at a first fixture lip of the fixture and at a second fixture lip of the fixture; and securing the fixture on the exterior blade surface of the blade body so that the first fixture lip and the second fixture lip are positioned adjacent to the first attachment surface and the second attachment surface, respectively;

wherein the blade tool parts of the one or more alignment tool sets are fixed to the fixture thereby securing the blade tool parts to the blade body, and/or wherein the first clamping tool and/or the second clamping tool is/are fixed to the fixture thereby securing the clamping tool(s) to the blade body.

A second aspect of this disclosure relates to a prefabricated fairing for being attached to a structural blade body to form a wind turbine blade, the wind turbine blade extending along a longitudinal axis from a root to a tip, the wind turbine blade comprising a root region and an airfoil region with the tip, the wind turbine blade comprising a chord line extending between a leading edge and a trailing edge thereof, the wind turbine blade comprising an aerodynamic exterior blade surface including a pressure side and a suction side, the fairing extending along the longitudinal axis and along a fairing profile terminating at a first fairing lip of the fairing and at a second fairing lip of the fairing, the fairing comprising:

an exterior fairing surface positioned exteriorly relative to the fairing profile, an interior fairing surface positioned interiorly relative to the fairing profile, and one or more fibre-reinforced layers extending from the first fairing lip to the second fairing lip and along the longitudinal axis.

Alternatively, the fairing may be a leading-edge protection device.

The fairing disclosed herein is not necessarily configured to extend along the whole length of the wind turbine blade but may only be configured to extend along part of it, such as only the tip region and/or such as a third or two thirds of the total length of a wind turbine blade. The fairing profile typically narrows towards the tip end of the wind turbine blade.

Additionally, or alternatively, the first and second fairing lips may be chamfered. In some embodiments, the first and second fairing lips are trimmed.

Additionally or alternatively, the fairing profile may be U-shaped. An apex of the fairing profile is configured for being coincident with the leading edge or trailing edge of the wind turbine blade and the sides of the fairing extend from this apex to the fairing lips.

Additionally, or alternatively, the fairing may have a first fairing state in which the fairing is adapted to be mounted to a blade body prior to being fixed and has a second fairing state in which the fairing is adapted to be fixed to the blade body, the fairing lips of the fairing being compressed towards each other in the second fairing state relative to the first fairing state, wherein the one or more fibre-reinforced layers of the fairing are configured for being deformed so that, upon application of a compression force onto the exterior fairing surface at fairing lips, the fairing is brought from the first fairing state to the second fairing state, wherein a difference between a first fairing lip distance and a second fairing lip distance is equal to or greater than 5 mm, 10 mm, 15 mm, 20 mm, or preferably 25 mm, the first fairing lip distance corresponding to a distance between the fairing lips when the fairing is in the first fairing state and the second fairing lip distance corresponding to a distance between the fairing lips when the fairing is in the second fairing state, the first fairing lip distance being greater than the second fairing lip distance.

This provides the advantage that when mounting the fairing on the blade body, any uncured adhesive present on the fairing lips or on the attachment surfaces is not scraped off during the mounting process. A further advantage is that corresponding fairing lip and attachment surface contact the uncured adhesive in a direction perpendicular to the adhesive plane, this may ensure improved wetting of the adhered surfaces.

Additionally, or alternatively, the fairing may have a length between 1%-50%, 5%-45%, 10%-40%, 20%-35% of the wind turbine blade length.

Additionally, or alternatively, the fairing may have a thickness between 1 mm-5 mm, or preferably between 2 mm-4 mm.

Additionally, or alternatively, the circumference of the fairing profile may be about 500 mm and a peripheral distance of both fairing lips from the leading or trailing edge of the fairing is about 250 mm.

All these dimensions are to be adapted to the specific conditions facing the specific wind turbine blade.

Additionally, or alternatively, the fairing may further have a relaxed fairing state in which the fairing profile assumes an unloaded shape, and wherein the fairing lips may be compressed towards each other in the first fairing state relative to the relaxed fairing state.

Additionally, or alternatively, the one or more fibre-reinforced layers may form part of a plurality of layers further including an exterior erosion-resistant layer forming at least a portion of the exterior fairing surface and being configured for defining the leading edge of the wind turbine blade, wherein the exterior erosion-resistant layer is preferably made of an elastomer, such as polyurethane.

In some embodiments, the fibre-reinforced layers may cover an entire inner surface of the erosion-resistant elastomer layer. In other embodiments, the fibre-reinforced layers may only cover part of the inner surface of the erosion-resistant sheet. For example, an area close to the first and/or second of the fairing may not be covered by the fibre-reinforced layers. In such embodiments, an inner surface of the erosion-resistant elastomer layer may be configured to contact the leading edge in these areas.

Additionally, or alternatively, the fairing may further comprise a cured first resin binding the erosion-resistant elastomer layer and the one or more fibre-reinforced layers together.

The present inventors have found that binding the erosion-resistant elastomer layer and one or more fibre-reinforced layers together with a single cured resin, before the fairing is adhered to the structural blade body of the wind turbine blade, results in a fairing with exceptional erosion resistance. This is attributed to the increased interface strength between the resin and the fairing material, achieved when the resin crosslinks and cures, creating covalent bonds. The fairing will also have an increased lifetime compared to conventional erosion shields, e.g. by coatings, tapes or shells.

By making the fairing in a separate mould, before it is attached to the structural blade body, the desired thickness and shape of the outer and inner surface of the fairing can be controlled, while ensuring that the erosion-resistant elasto-mer layer is in intimate contact with the underlying fibre-reinforced material. Adding to this, binding using a single resin also ensures that there are no cavities of areas of missing adhesive that would weaken the bond of the fairing to the blade. Thus, when the fairing is subsequently bonded to the structural blade body of a wind turbine blade, the fairing will not only provide a long-term resistance to erosion, but also a precise aerodynamic profile which does not decrease performance of the wind turbine blade.

Also, the fairing allows for a strong adherence between the fairing and the structural blade body, since the fibre-reinforced layers of the fairing and the fibre-reinforced material of the structural blade body will have a stronger bonding than what can be achieved by direct bonding of the erosion-resistant elastomer layer to the leading edge of a prior art wind turbine blade.

Additionally, or alternatively, the erosion-resistant elas-tomer layer may be an erosion-resistant elastomer sheet.

Additionally, or alternatively, the cured first resin may be epoxy resin, vinyl ester resin, or polyester resin, preferably epoxy ester resin.

Additionally, or alternatively, the erosion-resistant elas-tomer sheet may preferably be chemically compatible with the first resin.

Additionally, or alternatively, the exterior erosion-resis-tant elastomer layer may have a substantially constant thickness.

Additionally, or alternatively, the exterior erosion-resis-tant elastomer layer may have a thickness between 300 microns and 2 mm, such as between 750 microns or 1.5 mm.

Additionally, or alternatively, the exterior erosion-resis-tant elastomer layer may comprise a thermoplastic elasto-mer, preferably thermoplastic polyurethane.

Additionally, or alternatively, the polyurethane may be an aliphatic polyurethane and may be produced using long and short chain polyether, polyester, or caprolactone glycols. The polyether types have better hydrolytic stability and low-temperature flexibility, the polyester types have better mechanical properties, and caprolactones offer a good com-promise between the properties of the polyether and poly-ester types. Thermoplastic polyurethane is preferred since it has a low elastic modulus and easily adapts to the moulding surface. However, other materials for the erosion-resistant elastomer layer may also be suitable. An erosion-resistant elastomer layer comprising such material may have to be heated or influenced by other means to make them fully adapt to the moulding surface.

Additionally, or alternatively, the number of layers of the one or more fibre-reinforced layers is between 1-11, such as between 3-7, such as 5 or 6.

Additionally, or alternatively, the one or more fibre-reinforced layers may comprise glass fibre-reinforced mate-rial and/or carbon fibre-reinforced material.

Additionally, or alternatively, the one or more fibre-reinforced layers may comprise unidirectional, biaxial, and/or triaxial fibre sheets.

A third aspect of this disclosure relates to a method of manufacturing a fairing for a wind turbine blade, the fairing being according to the first aspect, the method comprising the steps of:

providing an erosion-resistant elastomer layer;

providing a fairing mould comprising a moulding surface;

arranging the erosion-resistant elastomer layer on the moulding surface;

arranging one or more fibre-reinforced layers on top of the erosion-resistant elastomer layer;

providing a first resin in the fairing mould so as to wet out the one or more fibre-reinforced layers and so as to contact the erosion-resistant elastomer layer; and curing the first resin so as to form and bind the erosion-resistant elastomer layer and the one or more fibre-reinforced layers as a unitary fairing via the first resin.

The present inventors have found that wetting out the one or more fibre-reinforced layers and simultaneously contact-ing the erosion-resistant elastomer layer with the first resin and then curing the resin to provide the unitary fairing, before the fairing is adhered to the structural blade body, results in a fairing with exceptional erosion resistance. This is attributed to the increased interface strength between the resin and the fairing material, achieved when the resin crosslinks and cures. The fairing will also have an increased lifetime compared to conventional erosion shields, e.g. by coatings, tapes or shells.

By making the fairing in a separate mould, before it is attached to the structural blade body, the desired thickness and shape of the outer and inner surface of the fairing can be controlled, while ensuring that the erosion-resistant sheet is in intimate contact with the underlying fibre-reinforced material. Adding to this, binding using the single resin also ensures that there are no cavities of areas of missing adhe-sive that would weaken the bond of the fairing to the blade. Thus, when the fairing is subsequently bonded to the struc-tural blade body of a wind turbine blade, the fairing will not only provide a long-term resistance to erosion, but also a precise aerodynamic profile which does not decrease per-formance of the wind turbine blade.

Also, the fairing allows for a strong adherence between the fairing and the structural blade body, since the fibre-reinforced layers of the fairing and the fibre-reinforced material of the structural blade body will have a stronger bonding than what can be achieved by direct bonding of the erosion-resistant elastomer layer to the leading edge of a prior art wind turbine blade.

The present inventors further found that the temperature before and after providing the first resin process has a strong effect on the interface strength. It was found that heating of the materials of the fairing before providing the resin yields a very high adhesion between the fairing materials. Further-more, either a post-cure process at high temperature for a short period of time or long room temperature post-cure has a strong effect on interphase strength and erosion perfor-mance.

Additionally, or alternatively, the first resin may be pro-vided by injection, e.g. via a vacuum-infusion resin transfer process, or by providing the one or more fibre-reinforced layers as prepreg and causing resin in the prepreg sheets to reflow and contact the erosion-resistant elastomer layer.

Additionally, or alternatively, the step of curing may comprise forming crosslinks between the first resin and the erosion-resistant elastomer layer.

Additionally, or alternatively, the method further may comprise a step of making the erosion-resistant elastomer layer conform to the moulding surface.

Additionally, the step of conforming the erosion-resistant elastomer layer to the moulding surface may be performed by at least one of the following:

heating the erosion-resistant elastomer layer; and/or applying a force on top of the cover, wherein the force may be applied by arranging a weight on top of the cover, the weight may preferably comprise a fluid enclosed in an elastomeric material, however other means may also be used; and/or applying a tackifier between the moulding surface and the erosion-resistant elastomer layer.

Additionally, or alternatively, the method may further comprise a step of arranging a cover on top of the one or more fibre-reinforced layers.

The cover protects the one or more fibre-reinforced layers during the provision of resin and subsequent curing thereof.

Additionally, or alternatively, the method may further comprise a step of applying one or more vacuums between the moulding surface and the cover.

Advantageously, the cover is pulled towards the moulding surface squeezing the erosion-resistant elastomer layer and the one or more fibre-reinforced layers there in between to reduce or even prevent formation of air bubbles during curing of the resin.

Additionally, or alternatively, the method may further comprise a step of applying a first vacuum at a first interface between a lower surface of the erosion-resistant elastomer layer and the moulding surface.

In this way, the first vacuum will pull the erosion-resistant elastomer layer towards the moulding surface to ensure the erosion-resistant elastomer layer conforms to the moulding surface while the fibre-reinforced layers are applied on top.

Additionally, or alternatively, the one or more vacuums may include a second vacuum is applied at a second interface between an upper surface of the one or more fibre-reinforced layers and a lower surface of the cover arranged on top of the one or more fibre-reinforced layers.

In this way, the second vacuum will be used to provide the resin, thus reducing the risk of resin entering between the fairing materials and the moulding surface. This especially advantageous when used with a first vacuum making the erosion-resistant elastomer layer conform to the moulding surface.

Additionally, or alternatively, the first vacuum may be applied before arranging the one or more fibre-reinforced layers on top of the erosion-resistant elastomer layer.

Additionally, or alternatively, the first vacuum may be applied after arranging the one or more fibre-reinforced layers on top of the erosion-resistant elastomer layer, and preferably simultaneously with or before applying the second vacuum.

In this way, the first vacuum is also used to provide the resin. However, with this method there is a risk of getting resin between the fairing materials and the moulding surface. This may be mitigated by carefully selecting non-deforming seal shape and material for the edge of the fairing that supports it while under vacuum so that the blade profile is not changed significantly by deformation.

Additionally, or alternatively, the method may comprise a step of adjusting the temperature of the erosion-resistant elastomer layer to at least 40° C., preferably to between 40-60° C., most preferably to 50° C., before and during the step of providing the first resin.

In this way, outstanding interface strength is achieved, leading to improved erosion resistance. This is because the fairing materials are exposed to uncured resin in a high energy state. This results in stronger molecular bonds than if the fairing materials is in a cured state with low surface energy, resulting in weaker molecular bonds. A result is that a fairing manufactured in this way has a decreased delamination.

In practice, the temperature of the erosion-resistant elastomer layer can be measured by an infrared detector, e.g. an infrared camera, and/or by a temperature sensor embedded in the fairing materials, and/or by inserting a thermometer between the cover and the moulding surface.

Additionally, or alternatively, the step of adjusting the temperature of the erosion-resistant elastomer layer may be performed by increasing the temperature underneath the cover to at least 40° C., preferably to between 40-60° C., most preferably to 50° C., and/or by heating the mould. The temperature may be adjusted electrically, e.g. by an electric current flowing through a resistor, or chemically, e.g. by an exotherm reaction such as the curing of a resin.

Additionally, or alternatively, wherein the step of curing the first resin may comprise curing the first resin at a temperature of at least 60° C., preferably at least 70° C., more preferably at 80° C.

Additionally, or alternatively, the step of curing the first resin may comprise curing the first resin at a temperature of between 60-130° C., such as between 70-100° C., such as between 80-90° C.

Additionally, or alternatively, the step of curing the first resin may include curing the first resin for at least 6 hours, such as 8 hours, such as 12 hours. For example, curing for 8 hours at 80° C. will ensure that the resin is fully reacted and safe for further handling.

Additionally, or alternatively, the step of providing an erosion-resistant elastomer layer may be performed by extruding the erosion-resistant elastomer layer.

Additionally, or alternatively, the one or more fibre-reinforced layers may be pre-impregnated.

A fourth aspect of the present disclosure relates to a fairing obtainable by the method according to the method according to the third aspect of this disclosure.

A fifth aspect of the present disclosure relates to a wind turbine blade comprising a fairing according to the second aspect or the fourth aspect of this disclosure.

A sixth aspect of the present disclosure relates to a method of manufacturing a wind turbine blade with a fairing, the method comprising the steps of:

providing a fairing in accordance with the method of the third aspect of this disclosure;

separately providing a structural blade body; and manufacturing the wind turbine blade by bonding the fairing to the structural blade body so that the fairing defines either the leading edge of the wind turbine blade or the trailing edge of the wind turbine blade.

Additionally, bonding of the fairing to the structural blade body of the wind turbine blade may comprise using an adhesive, such as a melt-adhesive or a structural adhesive, etc.

A seventh aspect of this disclosure relates to a kit of parts for assembly into a wind turbine blade extending along a longitudinal axis from a root to a tip, the wind turbine blade comprising a root region and an airfoil region with the tip, the wind turbine blade comprising a chord line extending between a leading edge and a trailing edge, the wind turbine blade comprising an aerodynamic exterior blade surface including a pressure side and a suction side, the kit of parts comprising:

a prefabricated structural blade body comprising:

a first exterior body surface defining part of the pressure side, a second exterior body surface defining part of the suction side, a first attachment surface located adjacent to the first exterior body surface, and a second attachment surface located adjacent to the second exterior body surface;

a prefabricated fairing preferably according to the second aspect of this disclosure or preferably made according to the method the third aspect of this disclosure, the fairing being configured for being fixed to the blade body so that the exterior fairing surface defines a part of the exterior blade surface connecting the first exterior body surface and the second exterior body surface, and so that the exterior fairing surface defines either the leading edge of the wind turbine blade or the trailing edge of the wind turbine blade; and a jig extending along the longitudinal axis and along a jig profile terminating at a first jig lip of the jig and at a second jig lip of the jig, the jig comprising:

an interior jig surface positioned interiorly relative to the jig profile and configured to match and receive the exterior fairing surface of the fairing, wherein the jig has a first jig state and a second jig state, wherein the jig profile in the first jig state matches the fairing profile in the first fairing state and the jig profile in the second jig state matches the fairing profile in the second fairing state;

Additionally, or alternatively, the kit of parts may further comprise one or more clamping tool sets each including:

a first clamping tool having a first clamping head and configured for being secured to the blade body adjacent to one of the attachment surfaces; and preferably a second clamping tool having a second clamping head and being secured to the blade body adjacent to the other one of the attachment surfaces;

wherein each clamping tool set is configured for actuating the clamping tools of each clamping tool set to urge the clamping heads to apply a compression force onto the exterior fairing surface.

Additionally, or alternatively, the kit of parts may further comprise one or more alignment tool sets each including:

a first tool pair including a first jig tool part and a first blade tool part secured to one of the fairing lips and to the blade body adjacent to the corresponding attachment surface, respectively, and preferably a second tool pair including a second jig tool part and a second blade tool part secured to the other fairing lip and to the blade body adjacent to the corresponding other attachment surface, respectively, wherein one of the tool parts of each tool pair comprises a pin and the other one of the tool parts of each tool pair comprises a guide configured for retaining the respective pin while allowing the pin to move along a predefined guide course from a pin entry position to a pin terminal position; wherein each tool pair is configured so that, when the pin is positioned in the pin entry position in the respective guide, the fairing is in the first fairing state, and so that, when the pin has been moved from the pin entry position to the pin terminal position along the predefined guide course, the fairing is in the second fairing state.

An eighth aspect of this disclosure relates to the use of a fairing according to the second or the fourth aspect of this disclosure for as an erosion shield for a leading edge of a wind turbine blade.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

FIGS. 9b-9d are schematic side views of steps of attaching the fairing to the blade body using the alignment tool set of FIG. 9a.

DETAILED DESCRIPTION OF THE INVENTION

Figure 1:
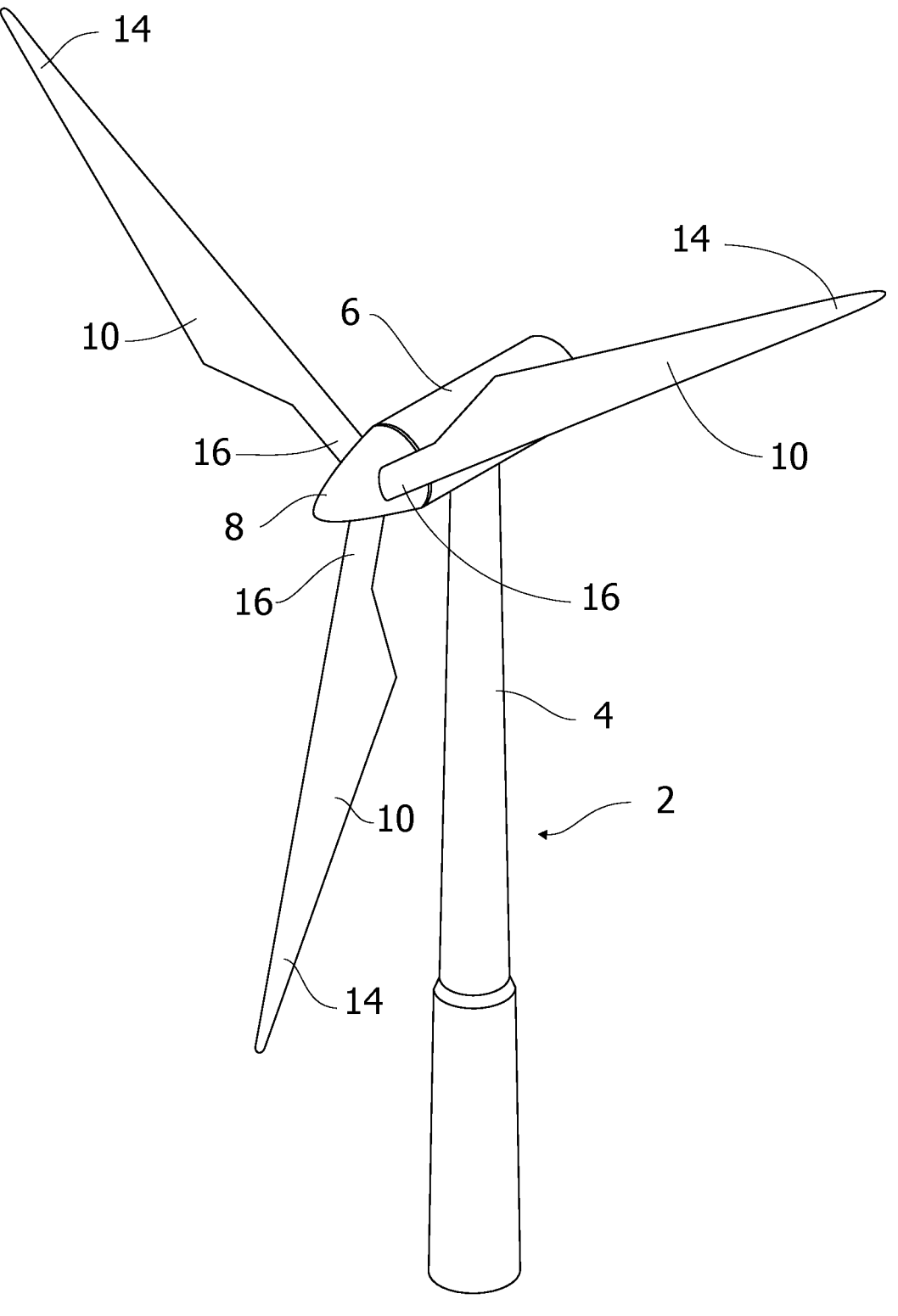
FIG. 1 is a schematic perspective view of a wind turbine.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

Figure 2:
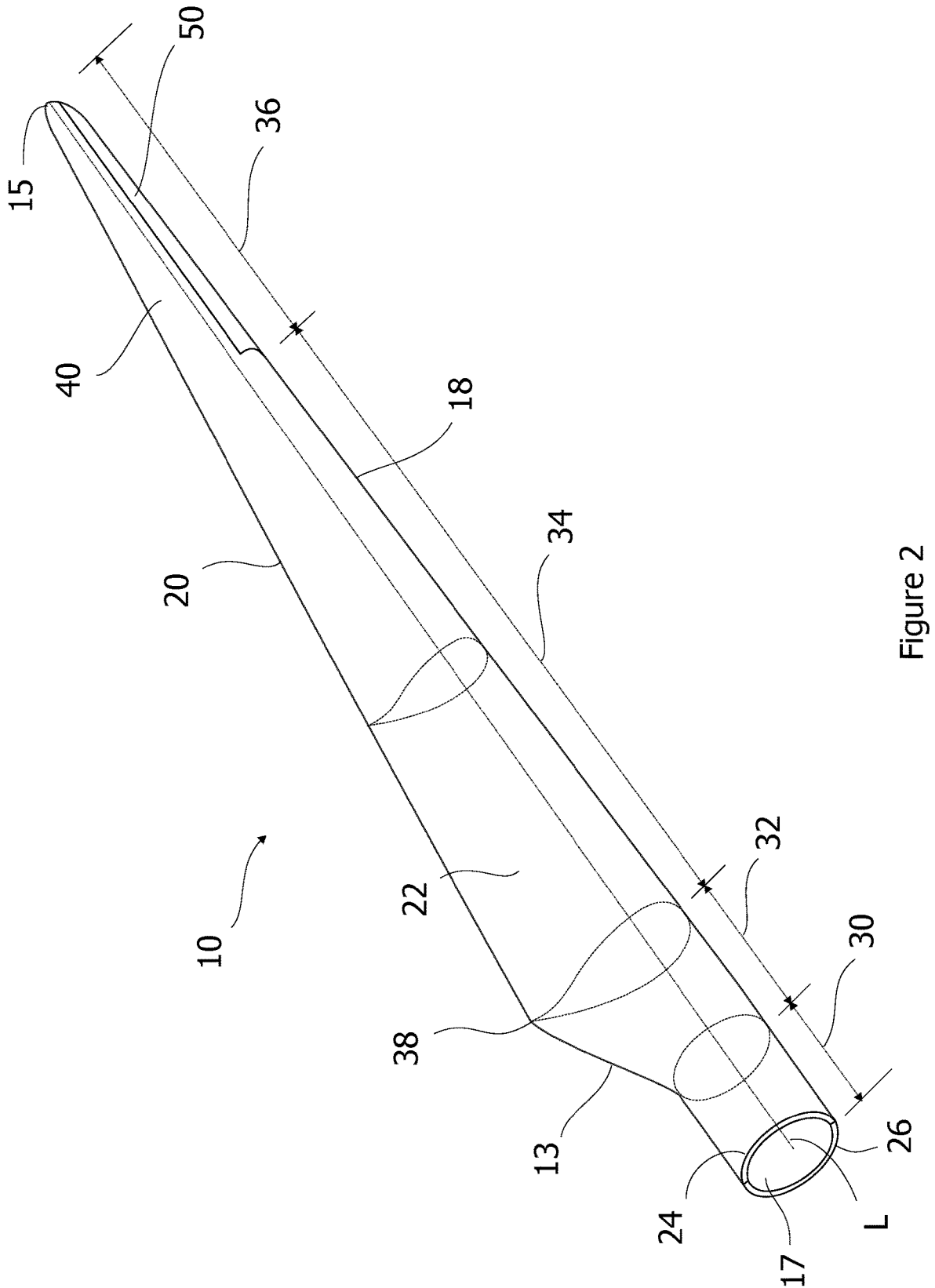
FIG. 2 is a schematic perspective view of a wind turbine blade with a fairing for the wind turbine as shown in FIG. 1.

FIG. 2 shows a schematic view of an exemplary wind turbine blade 10. The wind turbine blade 10 has the shape of a conventional wind turbine blade 10 extending along a longitudinal axis L between a root end 17 and a tip end 15 and comprises an aerodynamic exterior blade surface 22 including a root region 30 closest to the hub, a profiled or an airfoil region 34 furthest away from the hub and a transition region 32 between the root region 30 and the airfoil region 34. The airfoil region 34 includes a tip region 36 with the tip end 15. The blade 10 comprises a leading edge 18 facing the direction of rotation of the blade 10, when the blade is mounted on the hub 8, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing radial distance from the hub. The airfoil region 34 has an airfoil profile with a chord extending between the leading edge 18 and the trailing edge 20 of the blade 10. The width of the chord decreases with increasing radial distance from the hub.

A shoulder 38 of the blade 10 is defined as the position where the blade 10 has its largest chord length. The shoulder 38 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints extending along the trailing edge 20 and the leading edge 18 of the blade 10 to form a blade body 40. Typically, the root end of the blade shell parts 24, 26 have a semi-circular or semi-oval outer cross-sectional shape. The blade shell parts 24, 26 define the aerodynamic shape of the wind turbine blade and comprise a plurality of spar components (not shown) extending along the longitudinal axis L. The spar components provide the main bending stiffness of the blade 10. The blade body 40 comprises a section located in the tip region 36 to which a fairing 50 is attached.

The fairing 50 defines a part of the leading edge 18 and has been separately manufactured from the blade body 40 and subsequently attached to the blade body 40 so as to form the wind turbine blade 10. The fairing 50 is an external structure added to a structural blade body of the wind turbine blade 10 exposed to the air stream during operation of the wind turbine blade 10. The fairing 50 has the purpose of altering the air stream around the blade body 40 relative to the blade body 40 without the fairing 50 to more closely approximate an ideal airfoil profile. The blade body 40 and the fairing 50 define the wind turbine blade 10. The fairing 50 will typically extend to the tip end 15 of the wind turbine blade since the highest speeds occur at the tip end 15 and typically not in the root region 30 as the rotor speed there is relatively low. In the shown embodiment, the fairing 50 is located in the tip region 36 of the wind turbine blade 10 and extends from about two thirds of the blade length from the blade root 17 to the tip end 15 of the wind turbine blade 10. In other embodiments, the fairing 50 may be arranged differently, e.g. be located in the airfoil region 34 and/or not extend to the tip end 15.

The fairing 50 may be attached to the blade body by the method described in connection with FIGS. 3-9. The fairing may be of the types described in connection with FIGS. 11a-11b. The fairing may be manufactured by the method described in connection with FIG. 12.

Figure 3:
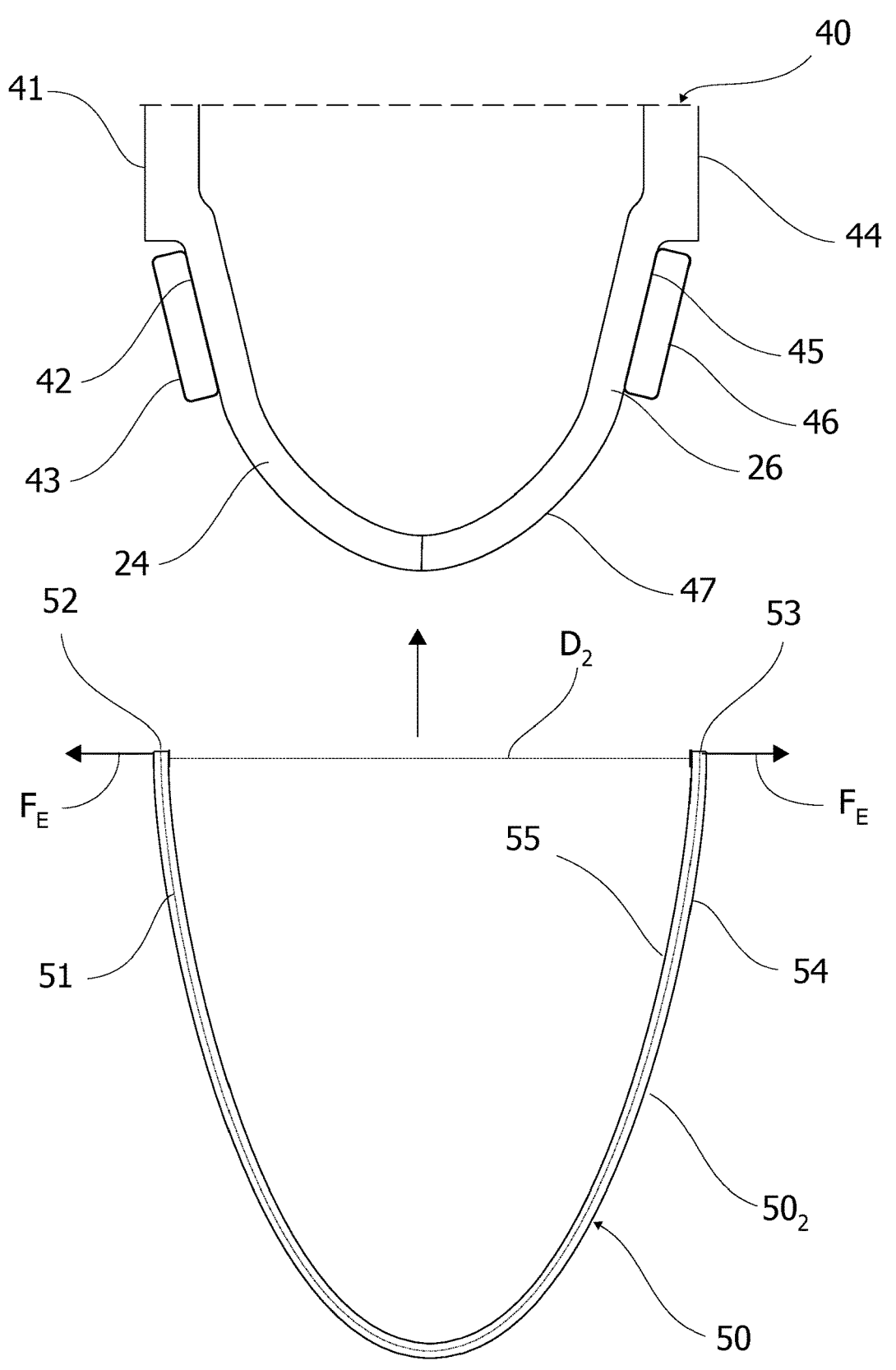
FIG. 3 is a schematic side view of the fairing being attached to a blade body to form the wind turbine blade of FIG. 2.
Figure 5:
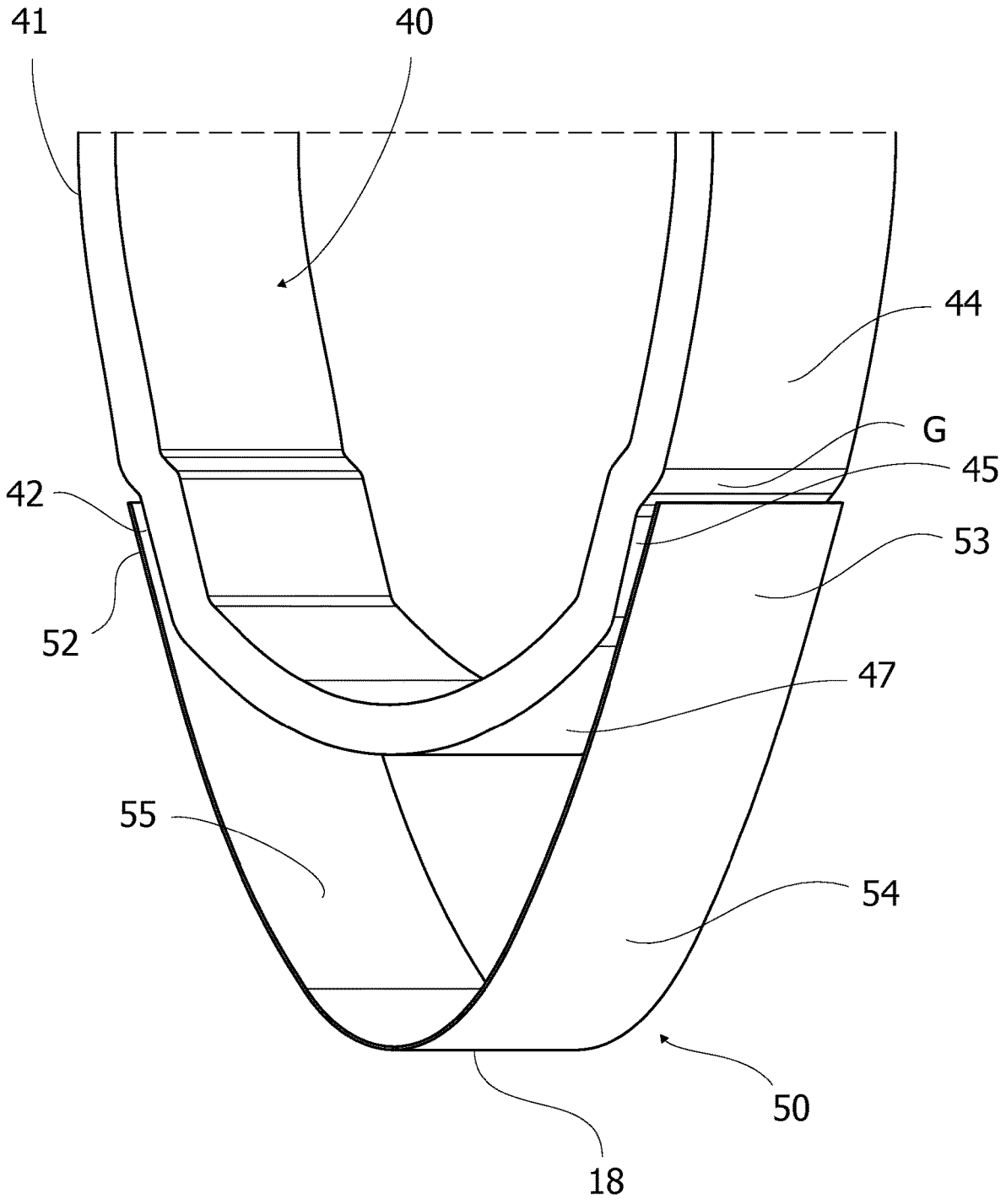
FIG. 5 is a schematic perspective view of a slice of the tip region of the wind turbine blade of FIG. 2 illustrating the fairing attached to the blade body.

As seen in FIGS. 3 and 5, the blade body 40 is a prefabricated structural blade body manufactured in a conventional way. The blade body 40 comprises a first exterior body surface 41 defining part of the pressure side of the wind turbine blade 10, a second exterior body surface 44 defining part of the suction side of the wind turbine blade 10, a first attachment surface 42 located adjacent to the first exterior body surface 41, a second attachment surface 45 located adjacent to the second exterior body surface, and a third exterior body surface 47 extending between the attachment surfaces 42, 45 opposite of the first and second exterior body surfaces 41, 44. The blade body 40 is composed of the pressure side shell part 24 and the suction side shell part 26 joined at a joint located at the midpoint of the third exterior body surface 47. A first uncured adhesive 43 is arranged on the first attachment surface 42, and a second uncured adhesive 46 is arranged on the second attachment surface 45 (alternatively, the adhesives 43, 46 may be arranged on the interior fairing surface 55 at the corresponding fairing lip 52, 53).

As seen in FIGS. 3 and 5, the fairing 50 is a double-curved (best seen in FIG. 5), plate-shaped prefabricated part fabricated separately from the blade body 40. The fairing 50 extends along the longitudinal axis L of the wind turbine blade 10 (the longitudinal axis L is perpendicular to the plane of FIG. 3) and along a U-shaped fairing profile 51 terminating at a first fairing lip 52 of the fairing 50 and at a second fairing lip 53 of the fairing 50. The fairing profile 51 defines the centre line of each cross-section of the fairing 50 along the longitudinal axis L, and the exterior fairing surface 54 and the interior fairing surface are arranged equidistant from the fairing profile 51. The fairing 50 further comprises an exterior fairing surface 54 positioned exteriorly relative to the fairing profile 51, an interior fairing surface 55 positioned interiorly relative to the fairing profile 51, and one or more fibre-reinforced layers (in the present embodiment, 5-6 glass fibre layers or carbon fibre layers are found advantageous) extending along the fairing profile 51 from the first fairing lip 52 to the second fairing lip 53 and along the longitudinal axis L.

When the fairing profile (and subsequently the jig profile and fixture profile) are referred to but not shown in the associated figures, the profile is found as the centre line between the associated exterior and interior surfaces of the associated element, e.g. the fairing, jig, or fixture.

Figure 4A:
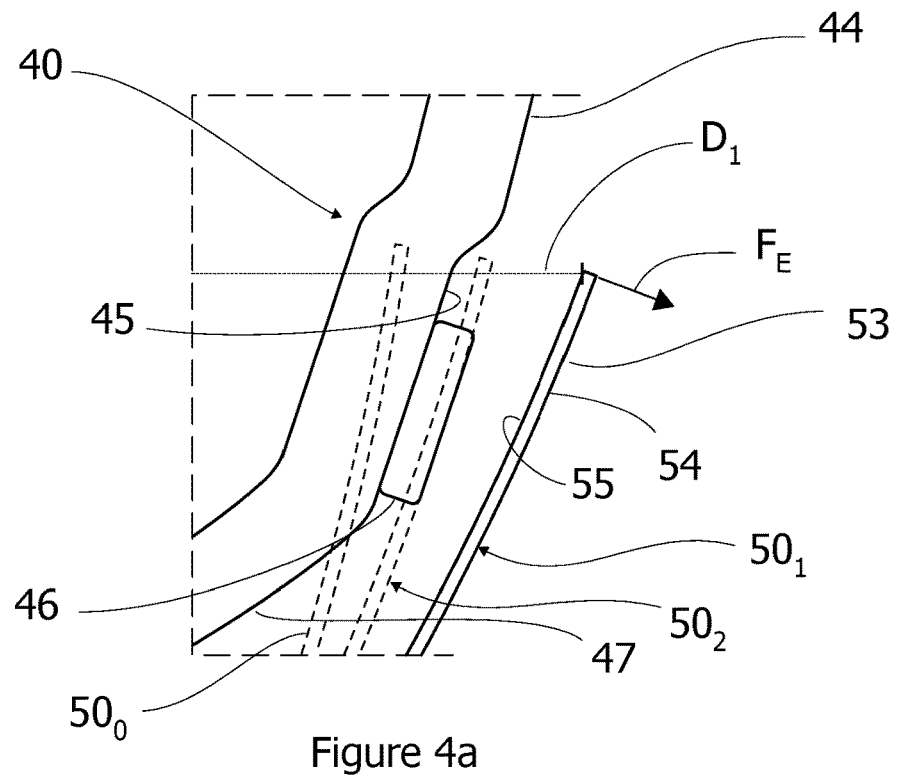
FIG. 4a is a schematic side view of a step of arranging a fairing lip of the fairing in a first fairing state adjacent to an attachment surface of the blade body. An outline of the relaxed fairing state and second fairing state are shown with dashed lines.

In this disclosure, the reference numeral subscripts $_0$, $_1$, and $_2$, denote the associated quantity or element when in its respective relaxed, first, and second state. For example in FIG. 3, the fairing $50_2$ is shown in its second fairing state. In this second fairing state, the fairing lips 52, 53 are distanced from each other by a fairing lip distance $D_2$. This fairing lip distance $D_2$ is the distance between the fairing lips 52, 53 when the fairing 50 is attached to the blade body 40. FIG. 4a show the fairing in a first fairing state $50_1$ in which the fairing lips 52, 53 are distanced from each other by a fairing lip distance $D_1$.

Prior to attaching the fairing 50 to the blade body 40, an expansion force $F_E$ is applied to the fairing lips 52, 53 urging them away from each other and increasing the fairing lip distance D until the fairing 50 is brought to its first fairing state $50_1$ with the fairing lip distance $D_1$ (which is best seen in FIG. 4a). The expansion force $F_E$ may for example be applied by pulling the fairing lips 52, 53 apart or may be applied by the fairing itself, e.g. if the fairing is relaxed in the second fairing state, then the fairing will attempt to revert to this second fairing state once stress is relieved. The fairing lips 52, 53 of the fairing $50_1$ are then moved (upwards on FIG. 3 along the arrow between the fairing 50 and the blade body 40) so that the blade body 40 is arranged between the fairing lips 52, 53 and the interior fairing surface 55 faces the attachment surfaces 42, 45 of the blade body 40. In this position, gaps are present respectively between the first attachment surface 42 of the blade body 40 and the first fairing lip 52 of the fairing $50_2$ (not shown but corresponds to the mirror image of FIG. 4a) and between the second attachment surface 45 of the blade body 40 and the second fairing lip 53 of the fairing $50_2$ to arrive at the arrangement shown in FIG. 4a. Furthermore, the fairing 50 is arranged with a spacing between the interior fairing surface 55 and the entire third exterior body surface 47 of the blade body 40 as best seen on FIGS. 5, 11a-11b, and 9a. During the movement of the fairing lips 52, 53 towards this position, it is advantageous to avoid scraping the first adhesive 45 off the first attachment surface 42 and avoid scraping the second adhesive 46 off the second attachment surface 45. This can be achieved by providing the fairing in this way with a second fairing state in which the fairing lip distance $D_2$ is sufficiently larger than the distance between the attachment surfaces 42, 45.

Figure 4B:
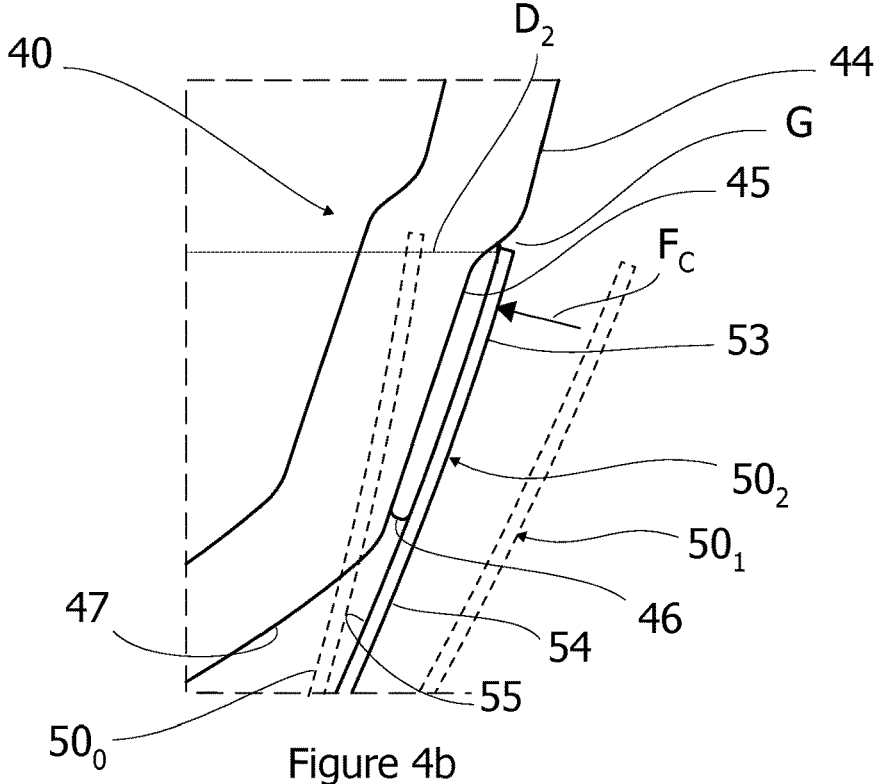
FIG. 4b is a schematic side view of a step subsequent of FIG. 4a of bringing the fairing lip in contact with an adhesive to attach the fairing lip to the attachment surface in order to bring the fairing to its second fairing state. An outline of the relaxed fairing state and first fairing state are shown with dashed lines.

Once the fairing is moved in the position shown in FIG. 4a, a compression force $F_c$ is applied onto the exterior fairing surface 54 at the fairing lips 52, 53 to deform the fibre-reinforced layers of the fairing 50 from the first fairing state $50_1$ to the second fairing state $50_2$ so that the first fairing lip 52 and the first attachment surface 42 are brought into contact with the first adhesive 43 (not shown but corresponds to a mirroring of FIG. 4b) and so that the second fairing lip 53 and the second attachment surface 45 are brought into contact with the second adhesive 46 as shown in FIG. 4b. In the present embodiment, the compression force $F_c$ is applied by the fairing itself since the relaxed fairing state has a smaller fairing lip distance than in the second fairing state, this is illustrated in FIGS. 4a-4b outlining the fairing in the relaxed fairing state $50_0$ overlapping the blade body 40. Thus, the fairing will attempt to revert to this relaxed shape applying the compression force $F_c$. In other embodiments, the second fairing state $50_2$ is equal to the relaxed fairing state $50_0$, and thus the compression force $F_c$ is applied through other means, for example by pushing the fairing lips 52, 53 towards each other.

The first and second adhesives 43, 46 are then cured, while the compression force $F_c$ is maintained, to fix the fairing 50 in its second fairing state $50_2$ to the blade body 40. Accordingly, the exterior fairing surface 54 defines a part of the exterior blade surface 22 of the wind turbine blade 10 and are arranged flush with the first exterior body surface 41 and the second exterior body surface 44 (as shown in FIGS. 4b, 5, and 11a-11b). Further, the exterior fairing surface 54 defines the leading edge 18 of the wind turbine blade 10. Thus, the fairing 50 is preferably a leading-edge protection fairing. In an alternative embodiment, a corresponding method could be applied to attach a trailing edge fairing to a blade body thereby defining the trailing edge of the wind turbine blade 10.

Figures 11A, 11B:
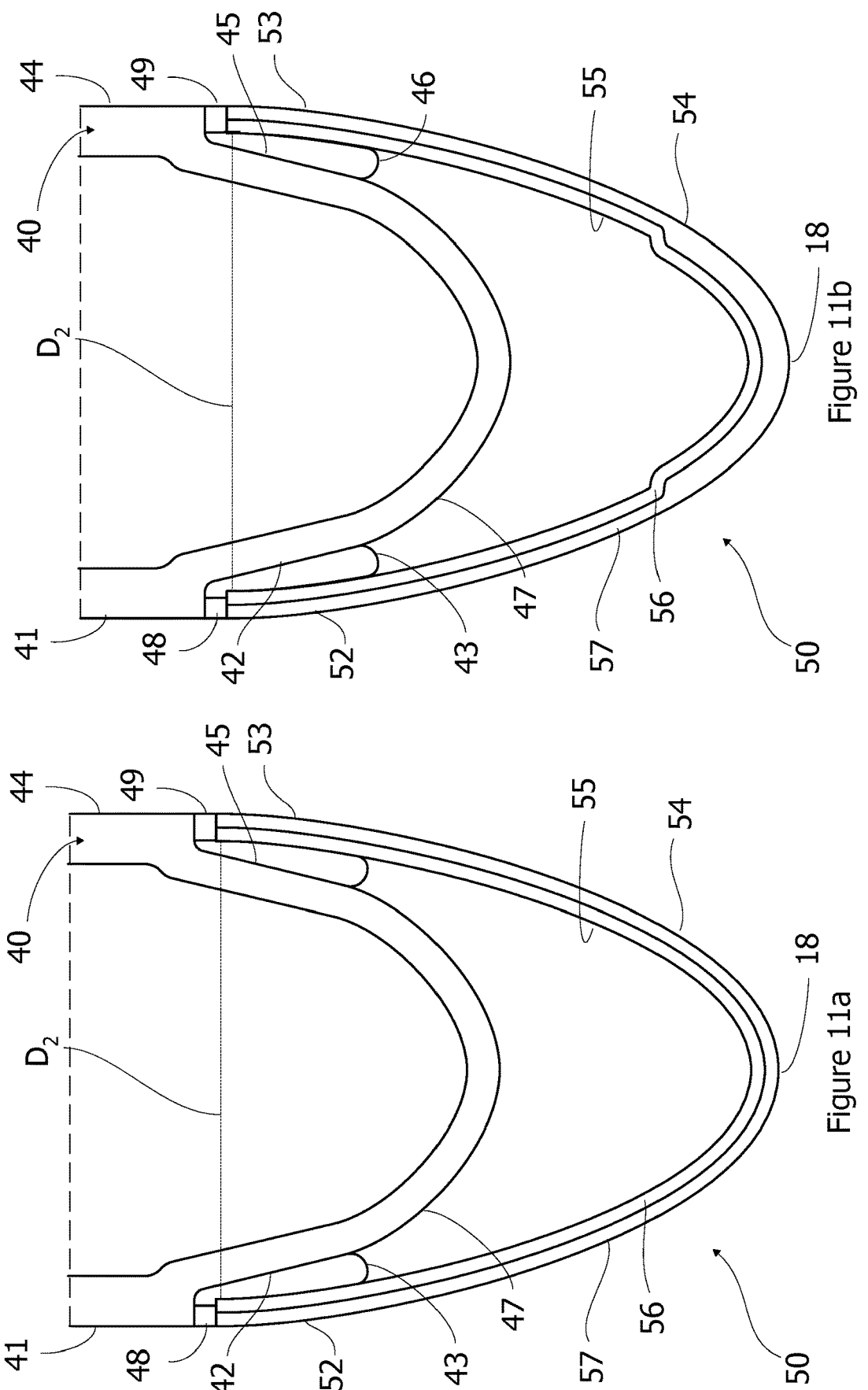
FIG. 11a is a schematic cross-sectional view of the wind turbine blade having a first embodiment of a fairing with an erosion-resistant elastomer layer.
FIG. 11b is a schematic cross-sectional view of the wind turbine blade having a second embodiment of a fairing with an erosion-resistant elastomer layer.

After the first and second adhesives 43, 46 are cured, the compression force $F_c$ is relieved. Any excess adhesive extending beyond the exterior blade surface 22 is removed and gaps G in the exterior blade surface 22 between the fairing lips 52, 53 and the blade body 40 as shown in FIGS. 4b and 5 are filled with fillers 48, 49, as best seen in FIGS. 11a-11b, which may be polished afterwards to ensure a smooth exterior blade surface 22.

Figure 6:
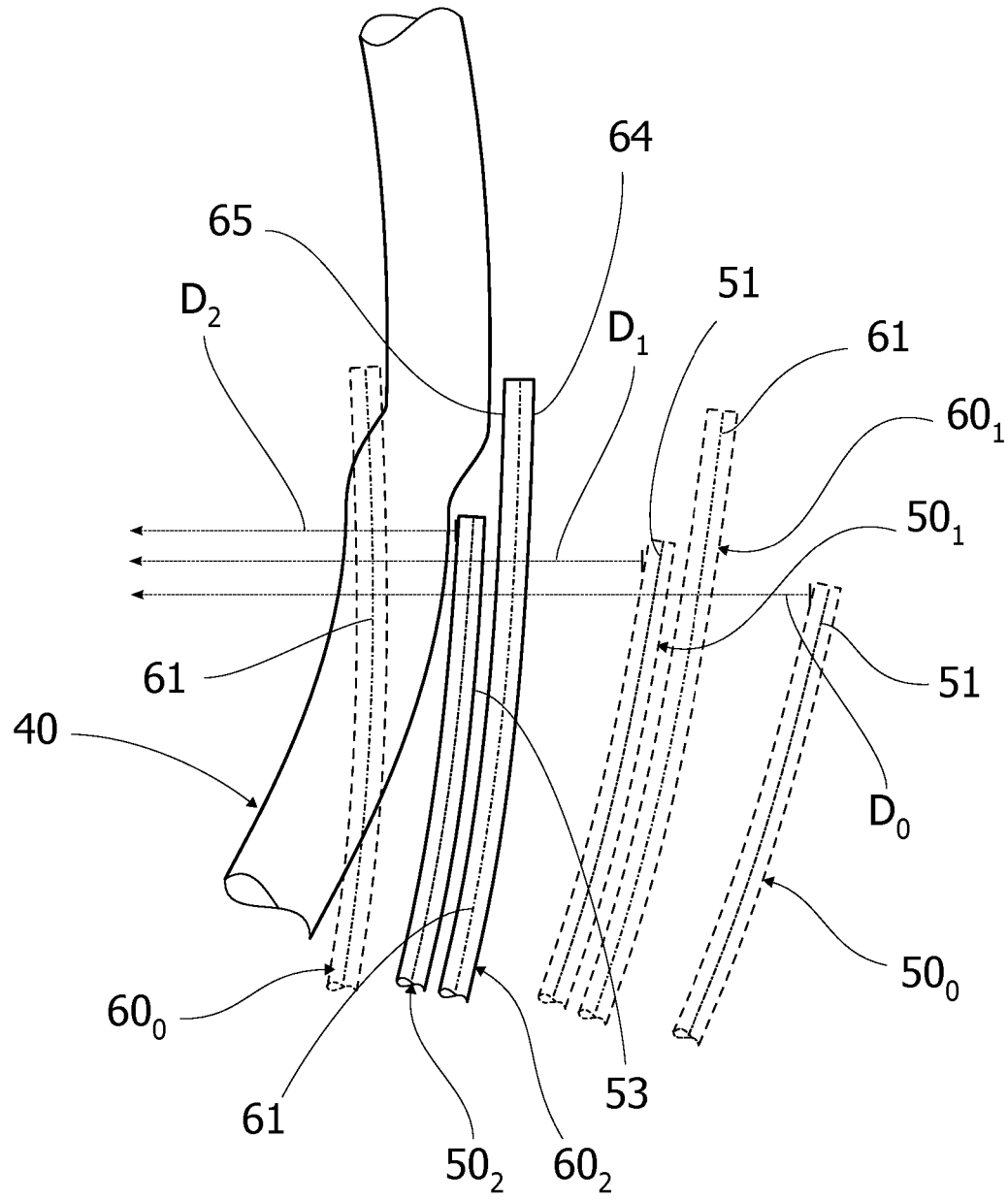
FIG. 6 is a schematic cross-sectional view of a jig and fairing arrangement for attaching the fairing to the blade body in their respective second jig state and second fairing state. An outline of the first jig and fairing state and the relaxed jig and fairing state are also shown with dashed lines.
Figure 8:
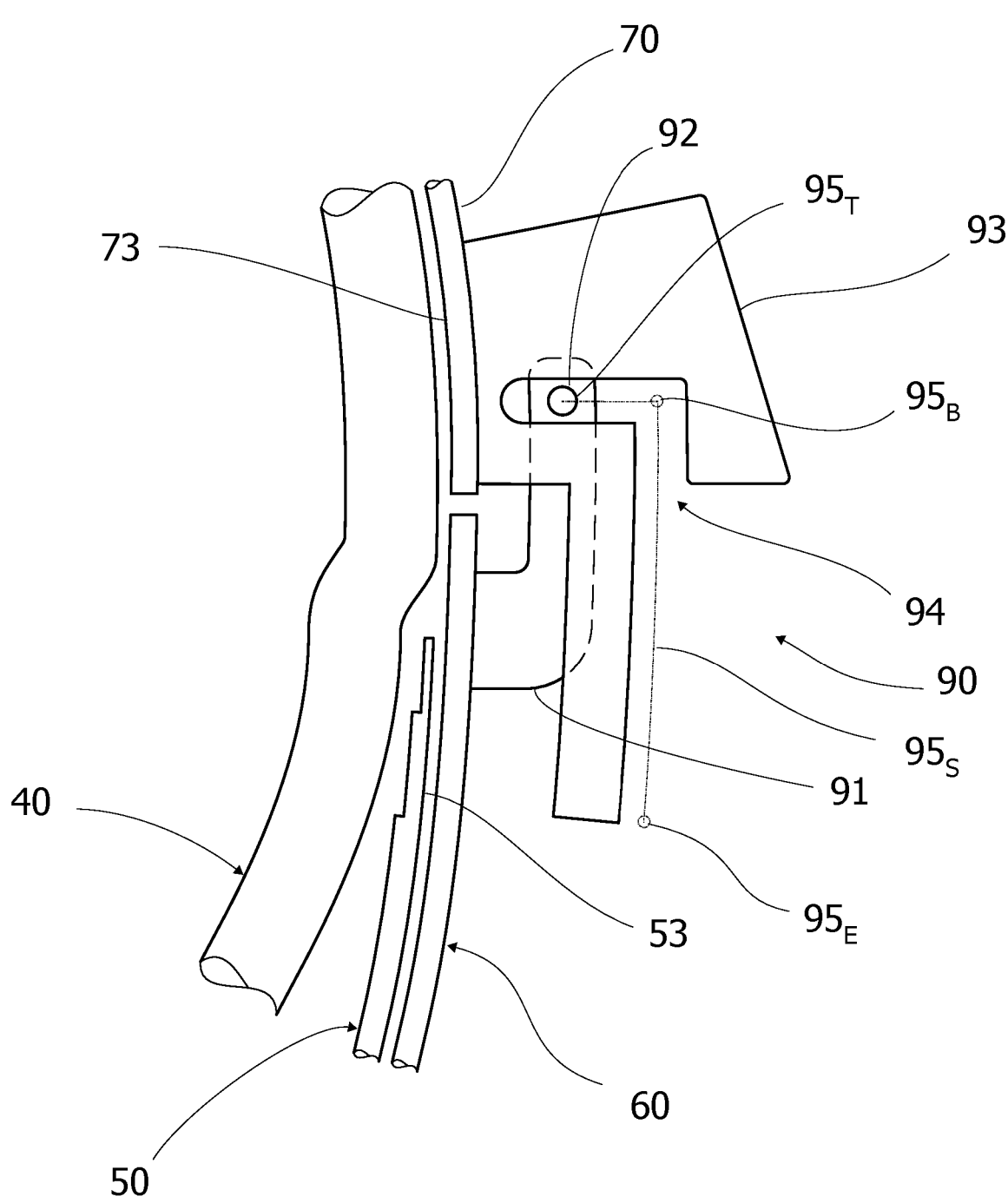
FIG. 8 is a schematic cross-sectional view of a first embodiment of an alignment tool set for attaching the fairing to the blade body.
Figure 9A:
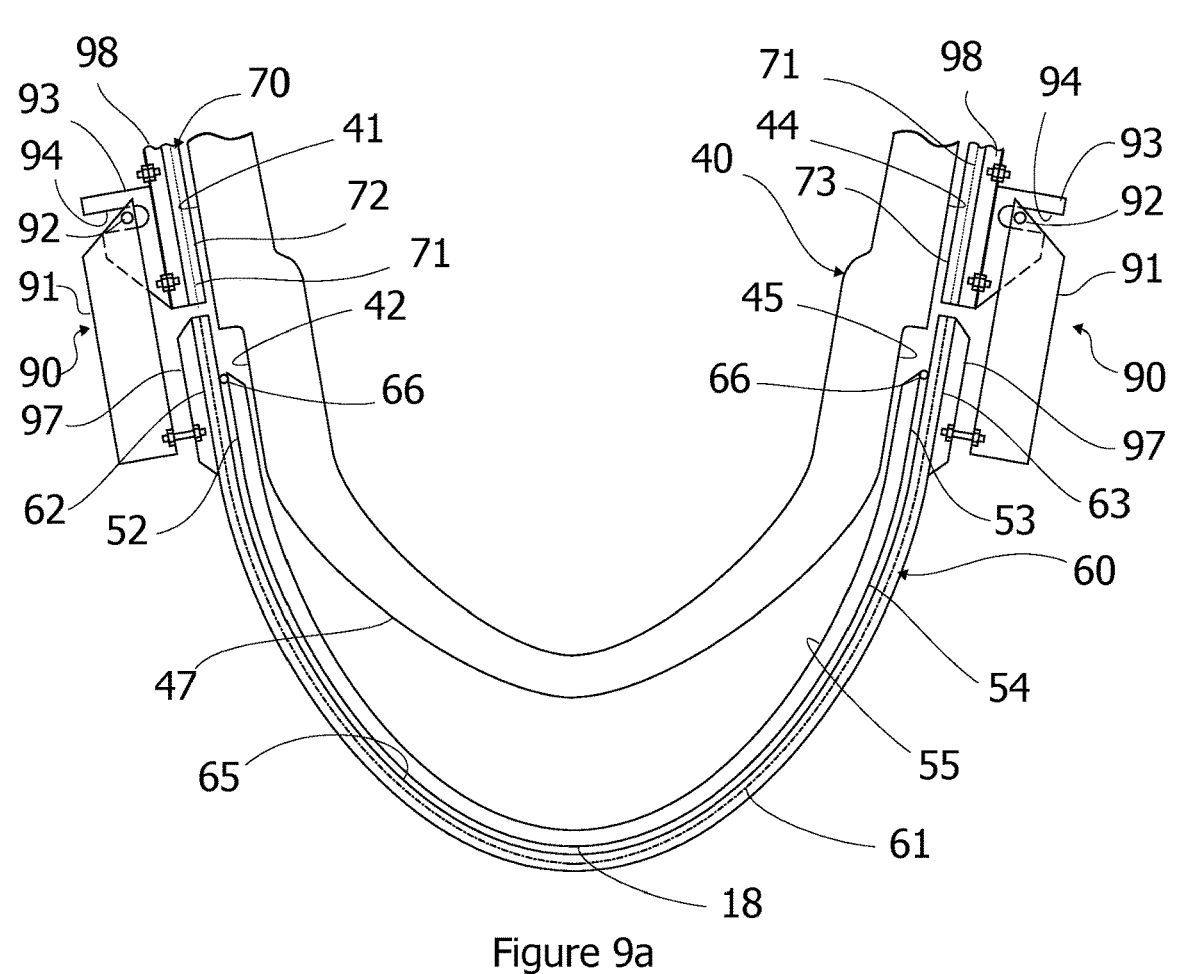
FIG. 9a is a schematic cross-sectional view of a second embodiment of an alignment tool for attaching the fairing to the blade body.
Figures 9B, 9C, 9D:
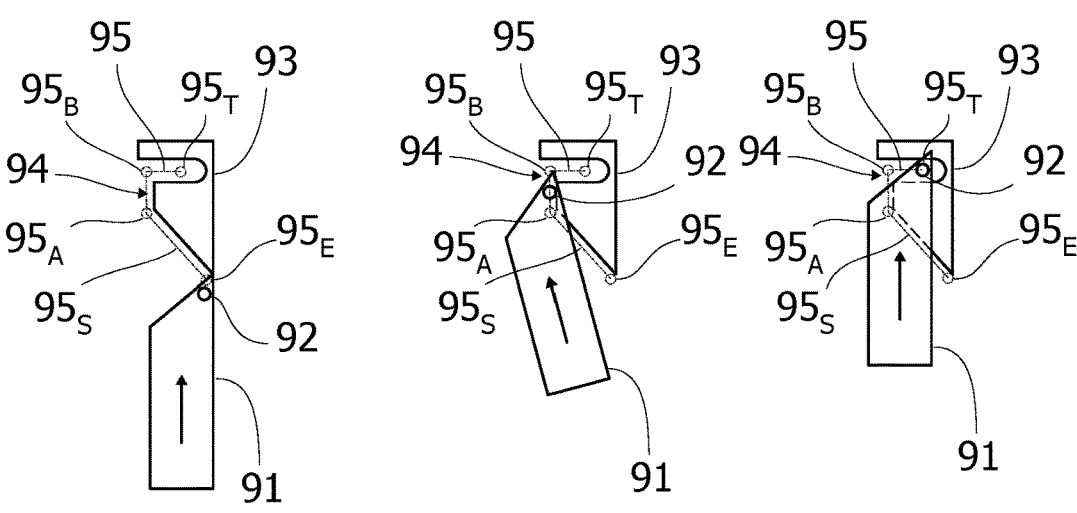

In another embodiment, a jig 60 as shown in FIGS. 6 and 9a is provided. The jig 60 extends along the longitudinal axis L (out of the plane of FIG. 6) and along a jig profile 61 terminating at a first jig lip 62 of the jig 60 (as best seen in FIG. 8) and at a second jig lip 63 of the jig. The jig is made of a resilient material, preferably a fibre-reinforced composite. The jig is preferably less stiff than the blade body 40. The jig profile 61 corresponds in shape essentially to the fairing profile 51 albeit being slightly larger so as to be configured for being arranged exteriorly of the fairing. The jig 60 further comprises an interior jig surface 65 positioned interiorly relative to the jig profile 61 and matching in shape the exterior fairing surface 54 of the fairing 50, and an exterior jig surface 64 positioned exteriorly relative to the jig profile 61. The jig 60 has a relaxed jig state $60_0$, a first jig state $60_1$ and a second jig state $60_2$. The jig profile 61 in the first jig state $60_1$ matches the fairing profile 51 in the first fairing state $50_1$. The jig profile 61 in the second jig state $60_2$ matches the fairing profile 51 in the second fairing state $50_2$ as best seen in FIG. 6. As seen in FIG. 6, the jig profile 61 in the second jig state $60_2$ is expanded relative to the jig profile 61 in the relaxed jig state $60_0$. Furthermore, as can also be seen in FIG. 6, the fairing profile 51 in the first fairing state $50_1$ is compressed relative to relaxed fairing state $50_0$.

The jig 60 of this embodiment is used by performing the following sub-steps prior to the step of arranging the fairing as was shown in FIG. 4a. Firstly, an expansion force is applied on the jig lips 62, 63 to expand jig lips of the jig so that the jig profile 61 matches the fairing profile 51 in the relaxed fairing state $50_0$. Secondly, the fairing 50 is positioned in the jig 60 so that the exterior fairing surface 54 abuts or contacts the interior jig surface 65 as shown in FIGS. 6 and 9a. Thirdly, the expansion force is then released so that the jig 60 and the fairing 50 are deformed to the first jig state $50_1$ and the first fairing state $60_1$, respectively. Advantageously, by arranging the relaxed jig state $50_0$ in this way, good contact between the interior jig surface 65 and the exterior fairing surface 54 is achieved in both the first states $50_1$, $60_1$ and second states $502$, $60_2$ as the fairing 50 will attempt to revert to its relaxed fairing state $50_0$ while the jig 60 will attempt to revert in the opposite direction to its relaxed jig state $60_0$.

Then the step of arranging the fairing as described in connection with FIG. 4a can be advantageously performed by handling the jig instead of the fairing reducing risk of damage to the fairing 50 and ensuring that the fairing 50, which may be a relatively dimensionally unstable part before being attached to the blade body, is kept in a stable state. Furthermore, the compression force $F_c$ can then be applied onto the exterior fairing surface 64 at the fairing lips 62, 63 so that the jig 60 and the fairing 50 are deformed to the second jig state $60_2$ and the second fairing state $502$, respectively. Advantageously, when the jig profile 61 in the relaxed jig state $60_0$ is arranged in this way, the compression force $F_c$ may be partly or entirely achieved by the spring back force of the jig 60 attempting to revert to its relaxed jig state $60_0$. However, if a simpler construction is desired (not shown), this can be achieved by arranging the relaxed jig state $60_0$ equal to the first jig state $60_1$ and/or the relaxed fairing state $50_0$ equal to the second fairing state $50_2$.

Figure 7:
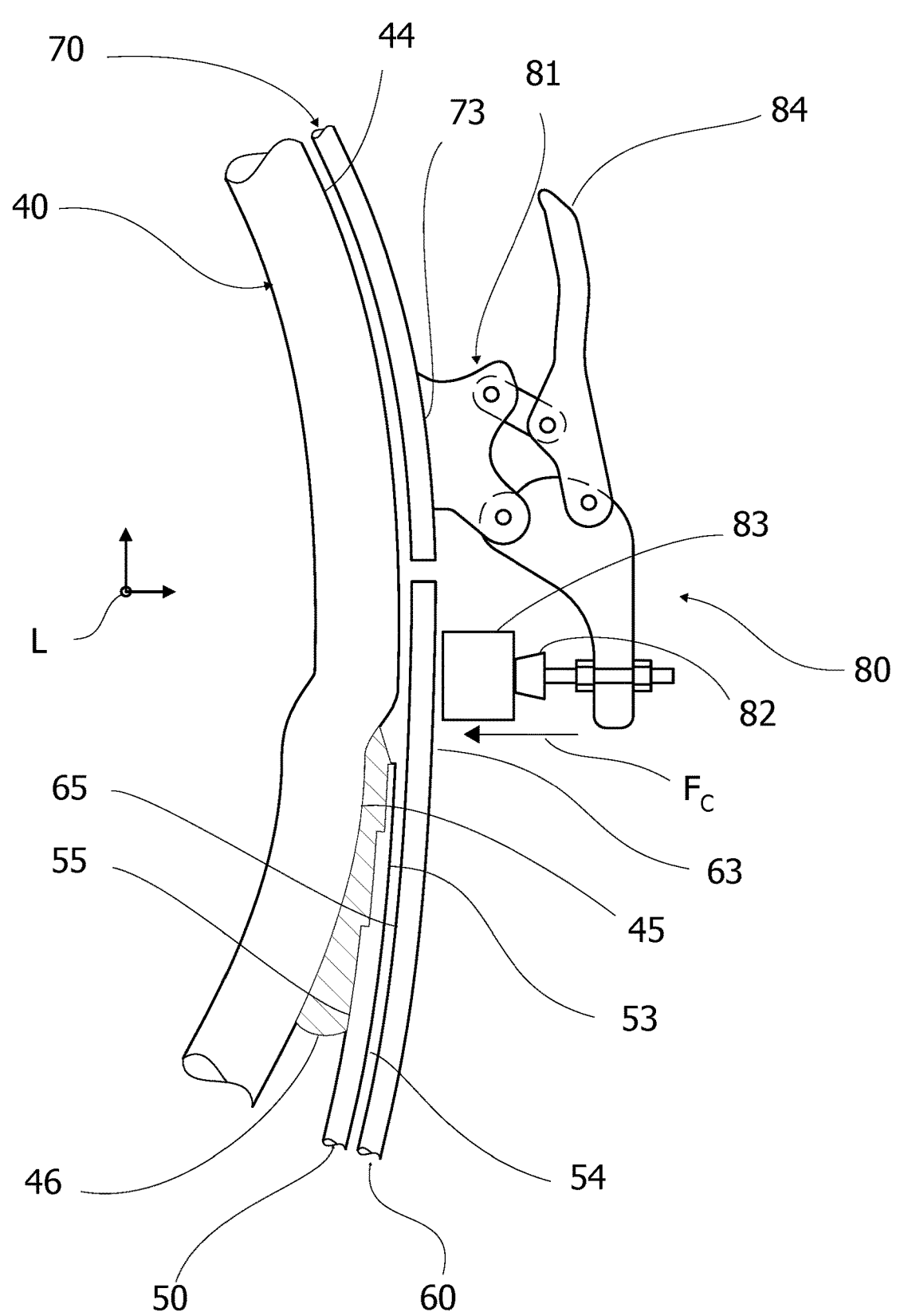
FIG. 7 is a schematic cross-sectional view of a clamping tool set for applying a compression force to bring a fairing lip of the fairing and an attachment surface of the blade body in contact with an adhesive.

One way of applying the compression force $F_c$ is by using one or more clamping tool sets. Such a clamping tool set 80 is shown in FIG. 7 and comprises a clamping tool 81 having a clamping head 82. The clamping tool 81 is secured to the blade body 40 adjacent to one of the attachment surfaces 42, 45. The clamping tool 81 is advantageously secured by a fixture 70. Such a fixture 70 is described after the clamping tool set 80.

Each clamping tool set 80 is capable of applying the compression force $F_c$ by actuating the clamping tool 81 and thereby urging the clamping head 82 towards the exterior fairing surface 54 to apply the compression force $F_c$ preferably via the exterior jig surface 64. In this embodiment, the clamping tool set is lever-actuated by operating a lever arm 84 of the clamping tool set 80. In other embodiments the clamping tool set 80 may be pneumatically, hydraulically, spring or electrically actuated. In order to efficiently distribute the force applied by the clamping head, a load distribution element 83, here a bar extending along the longitudinal axis L, can advantageously be positioned between the clamping head and the exterior jig surface 64. Advantageously, a plurality of clamping tool sets is distributed about 2 metres apart along the longitudinal axis L both along the first attachment surface 42 and the second attachment surface 45. This ensures that sufficient compression force $F_c$ can be applied.

As best seen in FIG. 9a, the fixture 70 extends along the longitudinal axis L and along a fixture profile 71 terminating at a first fixture lip 72 of the fixture 70 and at a second fixture lip 73 of the fixture 70. The fixture 70 is secured on the exterior blade surface 22 of the blade body 40 so that the first fixture lip 72 and the second fixture lip 73 are positioned adjacent to the first attachment surface 42 and the second attachment surface 45, respectively. Advantageously, the clamping tool 81 of each clamping tool set 80 can then be fixed to the fixture 70 thereby securing the clamping tools 81 to the blade body 40.

In order to aid with aligning the fairing 50 relative to the blade body 40, one or more alignment tool sets 90 can be provided as shown in FIGS. 8 and 9a-9d. A first embodiment of such an alignment tool 90 is shown in FIG. 8. The alignment tool set 90 comprises a first tool pair and a second tool pair. The first tool pair includes a first jig tool part 91 secured to one of the jig lips 62, 63 and a blade tool part 93 secured to the corresponding fixture lip 72, 73 adjacent to the corresponding attachment surface 42, 45. The second tool pair is identical to the first tool pair but arranged on the opposite side of the blade body, i.e. to the other jig lip and the other fixture lip. Each jig tool part 91 comprises a pin 92, and the blade tool part 93 comprises a guide 94 configured for retaining the pin 92 while allowing the pin 92 to move along a predefined guide course 95 from a pin entry position 95E to a pin terminal position 95T via a second pin position 95B. When initiating the step of arranging the fairing 50 adjacent to the blade body 40, each pin 92 is brought to the pin entry position 95E. Upon moving each pin 92 to the second pin position 95B, the spring back force of the jig 60 snaps each pin 92 to the pin terminal position 95T thus arriving at the arrangement shown in FIG. 8. Accordingly, the fairing 50 is advantageously aligned relative to the blade body 40.

Turning to FIGS. 9a-9d, a second embodiment of the alignment tool set 90 is shown. In this embodiment, the guide course 95 comprises a first pin position 95A and a sloping section 95s extending between the pin entry position 95E and the first pin position 95A and gradually increasing the fairing lip distance. Thus, when each pin 92 is located in the pin entry position 95E, the fairing 50 and jig 60 are in their second state, and upon moving each pin 92 to the first pin position 95A, the fairing 50 and jig 60 are brought to their first state, thereby eliminating this risk of scraping the first and second adhesive 43, 46 off the attachment surfaces 42, 45 of the blade body 40. Further, the jig tool parts 91 are attached to the exterior jig surface 64 via jig attachment plates 97, and the blade tool parts 93 are attached to the fixture lips 72, 73 via a fixture attachment plate 98. This allows further adjustability of the alignment tool set 90. Sealers 66 are arranged between the interior jig surface 65 and the exterior fairing surface 54 to increase the retention of the fairing 50 by the jig 60. A retention latch (not shown) may be provided on each blade tool parts 93 to ensure that each pin 92 does not leave the pin terminal position 95T.

Figure 10A:
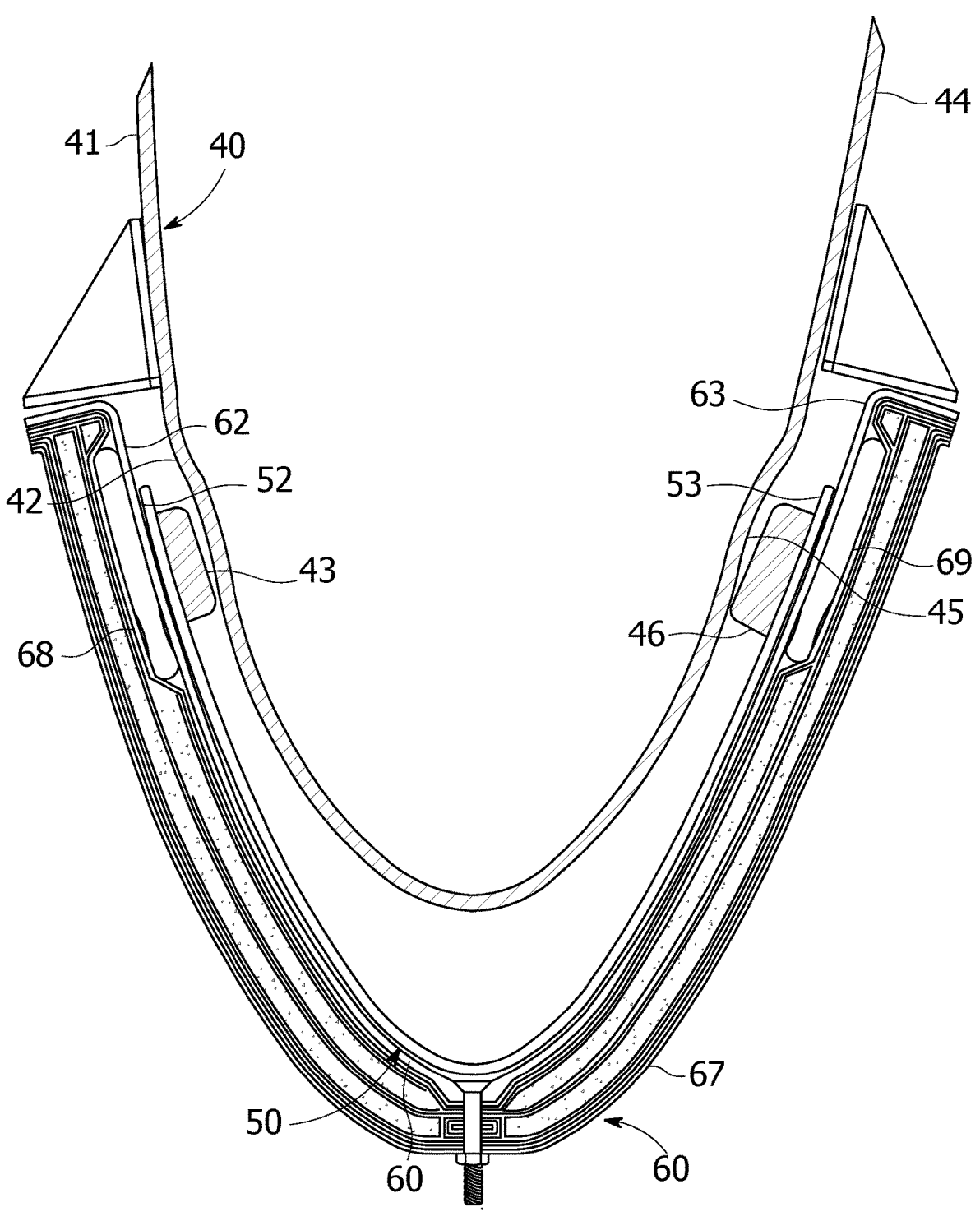
FIGS. 10a-c are schematic cross-sectional views of steps of arranging a fairing on a blade body via a jig comprising bladders. The reference numerals have intentionally not been repeated on all of FIGS. 10a-c to avoid cluttering the figures, but the reader will appreciate that a reference numeral shown in one figure applies to the corresponding element of the other figures.
Figure 10B:
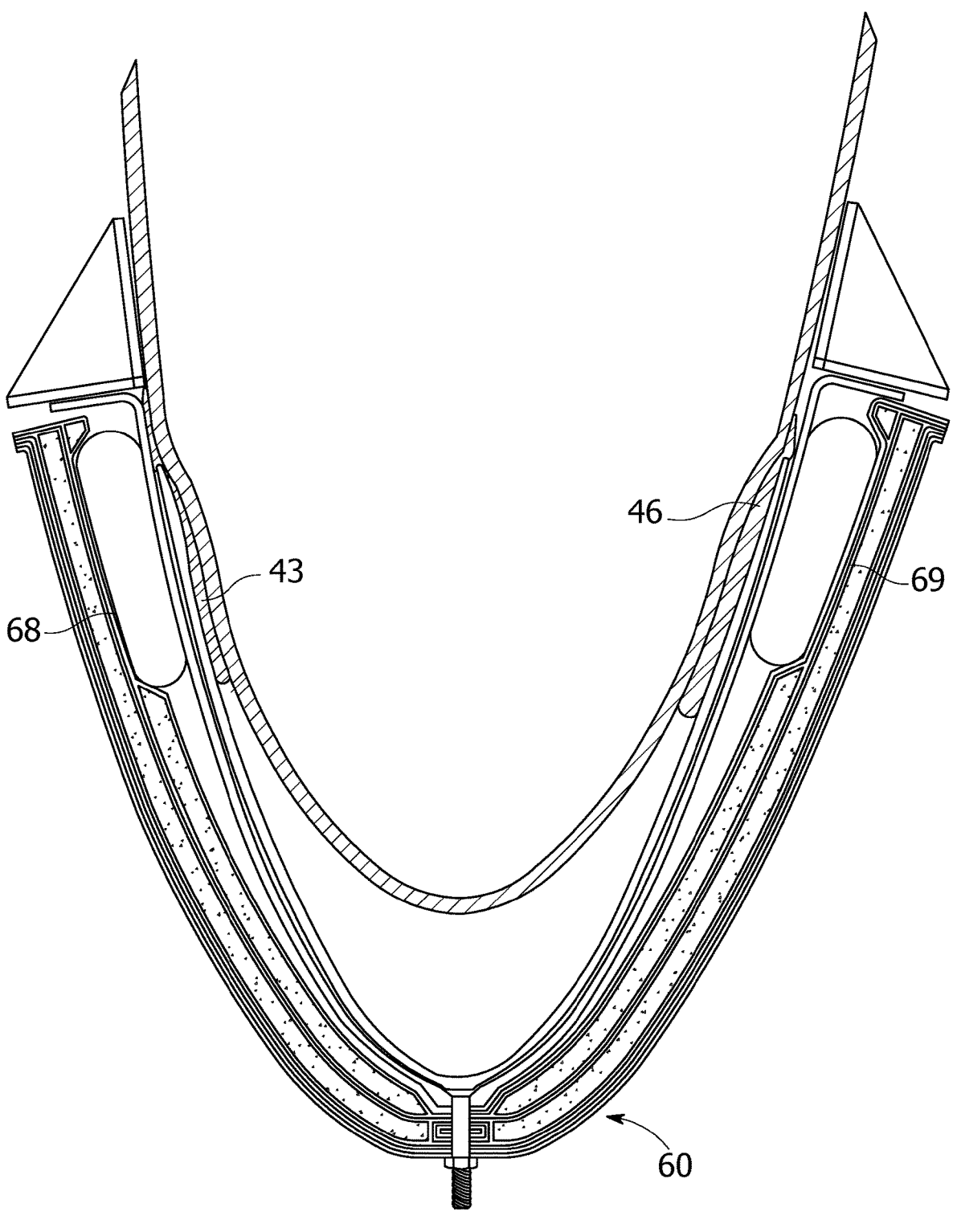
Figure 10C:
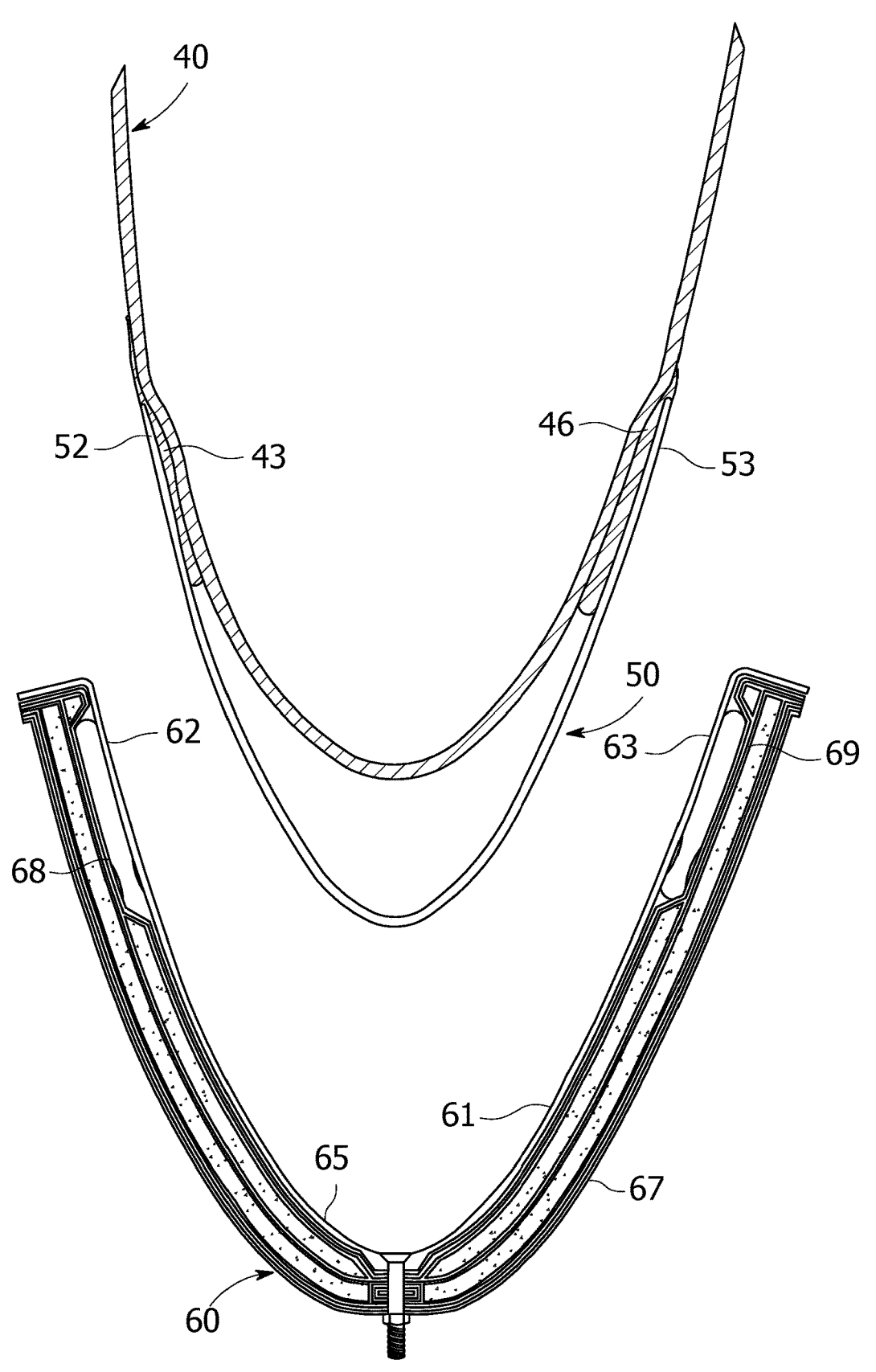

Turning to FIGS. 10a-c, a sequence of steps of fitting the fairing 50 to the blade body 40 is shown. In this embodiment, the jig 60 comprises a base part 67, a first bladder 68, and a second bladder 69. The jig lips 62, 63 are attached to the base part 67 via a bolt at the midpoint of the jig profile 61. In the present embodiment, the first and second adhesive 43, 46 are arranged on the fairing lips 52, 53 but may alternatively be arranged on the attachment surfaces 42, 45. The first bladder 68 is arranged between the base part 67 and the first jig lip 62 and the second bladder is arranged between the base part 67 and the second jig lip 63. When the first fairing lip 52 and the first attachment surface 42 as well as the second fairing lip 53 and the second attachment surface 45 are arranged adjacent, respectively (as shown in FIG. 10a), the first and second bladder 68, 69 are inflated to apply the compression force to urge the jig lips 62, 63 and thus the fairing lips 52, 53 towards the attachment surfaces 42, 45 (as shown in FIG. 10b). The base part 67 is rigid compared to the jig lips 62, 63 so that when the bladders 68, 69 are inflated, the base part 67 substantially retains its original geometry while the jig lips 62, 63 are forced towards each other. When the first and second adhesive 43, 46 are cured, the first and second bladders 68, 69 are deflated and the jig 60 is removed to leave the fairing 50 attached to the blade body 40 as shown in FIG. 10c.

Two embodiments of the fairing 50 fitted to the blade body 40 are shown in FIGS. 11*a* and 11*b*. In both embodiments, the fairing 50 comprises an erosion-resistant elastomer layer 57 of polyurethane forming part of the exterior fairing surface 54 and being configured to be in contact with the external environment of the wind turbine blade 10. The erosion-resistant elastomer layer 57 is preferably formed by an extrusion process. Furthermore, the fairing 50 comprises a number of fibre-reinforced layers 56 including a first fibre-reinforced layer forming part of the interior fairing surface 55 and faces the third blade body surface 47, and a number, e.g. 4-5, of second fibre-reinforced layers arranged between the first fibre-reinforced layer and the erosion-resistant elastomer layer 57. A cured first resin (not visible on the figures) binds the erosion-resistant elastomer layer 57 and the one or more fibre-reinforced layers 56 together. The number of fibre-reinforced layers 56 are preferably biaxial glass fibre sheets. In the second embodiment shown in FIG. 11*b*, the erosion-resistant elastomer layer 57 comprises a reinforced portion at the leading edge 18 of the wind turbine blade 10, to increase the erosion resistance of the fairing 50.

Figure 12:
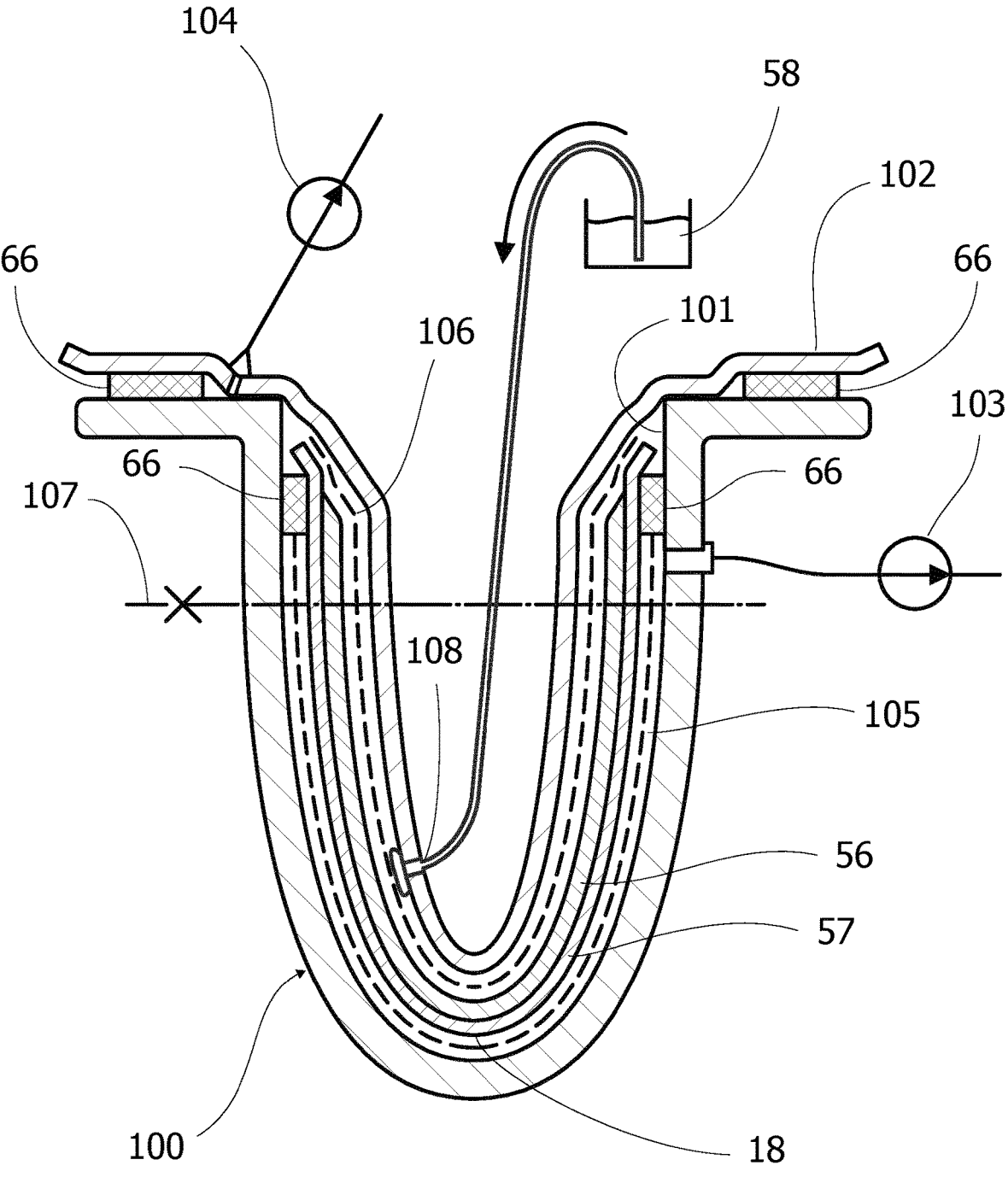
FIG. 12 is a schematic cross-sectional view of a mould set up for manufacturing a fairing.

The erosion-resistant fairing 50 described above in connection with FIGS. 11*a*-11*b* may be manufactured in a mould set up as shown in FIG. 12 and in the following way:

provide an erosion-resistant elastomer layer 57;

provide a fairing mould 100 comprising a moulding surface 101;

arrange the erosion-resistant elastomer layer 57 on and conforming it to the moulding surface 101;

apply a first vacuum 103 at a first interface 105 between a lower surface of the erosion-resistant elastomer layer 57 and the moulding surface;

arrange fibre-reinforced layers 56 on top of the erosion-resistant elastomer layer 57;

arrange a cover 102 on top of the fibre-reinforced layers 56;

apply a second vacuum 104 at the second interface 106 between an upper surface of the fibre-reinforced layers 56 and a lower surface of the cover 102 arranged on top of the fibre-reinforced layers 56 so as to pull the cover 102 towards the fibre-reinforced layers 56;

adjust the temperature of the erosion-resistant elastomer layer 57 to 50° C., and then immediately inject a first resin 58 via a resin inlet 108 in the cover 102 so as to wet out the fibre-reinforced layers 56 and so as to contact the erosion-resistant elastomer layer 57 in the fairing mould 100; and curing the first resin at a temperature of 80° C. for 8 hours so as to form and bind the erosion-resistant elastomer layer 57 and the fibre-reinforced layers 56 as a unitary fairing 50 via the first resin 58, wherein curing of the first resin preferably forms crosslinks between the first resin 58 and the erosion-resistant elastomer layer 57.

Once the fairing 50 is cured, the cover layer is removed, and any excess resin may be cleaned off. The fairing can then be removed from the fairing mould 100 and cut to the desired shape along a cut plane 107.

| LIST OF REFERENCES | |
|---|---|
| 2 | wind turbine |
| 4 | tower |
| 6 | nacelle |
| 8 | hub |
| 10 | blade |
| 13 | shell |

22

-continued

| LIST OF REFERENCES | |
|---|---|
| 14 | blade tip |
| 15 | tip end |
| 16 | blade root |
| 17 | root end |
| 18 | leading edge |
| 20 | trailing edge |
| 22 | exterior blade surface |
| 24 | pressure side shell part |
| 26 | suction side shell part |
| 30 | root region |
| 32 | transition region |
| 34 | airfoil region |
| 36 | tip region |
| 38 | shoulder |
| 40 | blade body |
| 41 | first exterior body surface |
| 42 | first attachment surface |
| 43 | first adhesive |
| 44 | second exterior body surface |
| 45 | second attachment surface |
| 46 | second adhesive |
| 47 | third exterior body surface |
| 48 | first filler |
| 49 | second filler |
| 50 | fairing |
| 51 | fairing profile |
| 52 | first fairing lip |
| 53 | second fairing lip |
| 54 | exterior fairing surface |
| 55 | interior fairing surface |
| 56 | fibre-reinforced layer |
| 57 | exterior erosion-resistant elastomer layer |
| 58 | first resin |
| 60 | jig |
| 61 | jig profile |
| 62 | first jig lip |
| 63 | second jig lip |
| 64 | exterior jig surface |
| 65 | interior jig surface |
| 66 | sealer |
| 67 | base part |
| 68 | first bladder |
| 69 | second bladder |
| 70 | fixture |
| 71 | fixture profile |
| 72 | first fixture lip |
| 73 | second fixture lip |
| 80 | clamping tool set |
| 81 | clamping tool |
| 82 | clamping head |
| 83 | load distribution element |
| 84 | lever arm |
| 90 | alignment tool set |
| 91 | jig tool part |
| 92 | pin |
| 93 | blade tool part |
| 94 | guide |
| 95 | guide course |
| $95_E$ | pin entry position |
| $95_A$ | first pin position |
| $95_B$ | second pin position |
| $95_T$ | pin terminal position |
| $95_S$ | sloping section |
| 97 | jig attachment plate |
| 98 | fixture attachment plate |
| 100 | fairing mould |
| 101 | moulding surface |
| 102 | cover |
| 103 | first vacuum |
| 104 | second vacuum |
| 105 | first interface |
| 106 | second interface |
| 107 | cut plane |
| 108 | resin inlet |
| L | longitudinal axis |
| $F_C$ | compression force |

-continued

| LIST OF REFERENCES | | |
|---|---|---|
| $F_E$ | expansion force | |
| D | fairing lip distance | |
| G | gap | |

The invention claimed is:

1. A method of assembling a wind turbine blade extending along a longitudinal axis from a root to a tip, the wind turbine blade comprising a root region and an airfoil region with the tip, the wind turbine blade comprising a chord line extending between a leading edge and a trailing edge, the wind turbine blade comprising an aerodynamic exterior blade surface including a pressure side and a suction side, the method comprising:

providing a prefabricated structural blade body comprising:

a first exterior body surface defining part of the pressure side, a second exterior body surface defining part of the suction side, a first attachment surface located adjacent to the first exterior body surface, and a second attachment surface located adjacent to the second exterior body surface;

separately providing a prefabricated fairing extending along the longitudinal axis, the fairing extends along a fairing profile terminating at a first fairing lip of the fairing and at a second fairing lip of the fairing, the fairing comprising:

an exterior fairing surface positioned exteriorly relative to the fairing profile, an interior fairing surface positioned interiorly relative to the fairing profile, and one or more fibre-reinforced layers extending from the first fairing lip to the second fairing lip and along the longitudinal axis, wherein the fairing has a first fairing state and a second fairing state, wherein the fairing lips are forced toward each other in the second fairing state relative to the first fairing state;

while the fairing is in the first fairing state, arranging the fairing so that the interior fairing surface faces the attachment surfaces of the blade body and gaps are present respectively between the first attachment surface of the blade body and the first fairing lip of the fairing and between the second attachment surface of the blade body and the second fairing lip of the fairing;

applying a compression force onto the fairing lips to deform the one or more fibre-reinforced layers of the fairing from the first fairing state to the second fairing state so that the first fairing lip and the first attachment surface are brought into contact with a first adhesive and so that the second fairing lip and the second attachment surface are brought into contact with a second adhesive; and while maintaining the compression force, curing the first and second adhesives to fix the fairing in its second fairing state to the blade body so that the exterior fairing surface defines a part of the exterior blade surface arranged flush with the first exterior body surface and the second exterior body surface and so that the exterior fairing surface defines either the leading edge of the wind turbine blade or the trailing edge of the wind turbine blade, wherein the fairing further has a relaxed fairing state in which the fairing is relaxed and wherein the fairing lips are expanded away from each other in the first and second fairing states relative to the relaxed fairing state.

2. The method according to claim 1, further comprising:

providing a jig extending along the longitudinal axis and along a jig profile terminating at a first jig lip of the jig and at a second jig lip of the jig and corresponding in shape to the fairing profile, the jig further comprising an interior jig surface positioned interiorly relative to the jig profile and matching the exterior fairing surface of the fairing, wherein the jig has a first jig state and a second jig state, wherein the jig profile in the first jig state matches the fairing profile in the first fairing state and the jig profile in the second jig state matches the fairing profile in the second fairing state.

3. The method according to claim 2, wherein the method comprises, prior to the arranging the fairing:

applying an expansion force on the jig lips to expand jig lips of the jig;

positioning the fairing in the relaxed fairing state in the jig so that the exterior fairing surface contacts the interior jig surface; and releasing the expansion force until the jig and the fairing are deformed to the first jig state and the first fairing state, respectively;

wherein the compression force is applied onto the exterior fairing surface at the fairing lips so that the jig and the fairing are deformed to the second jig state and the second fairing state, respectively.

4. The method according to claim 2, wherein the jig has a relaxed jig state and wherein the jig lips are expanded in the first jig state and second jig state relative to the relaxed jig state, wherein the step of applying the compression force is at least partly achieved by a spring back force of the jig upon releasing the expansion force on the jig lips.

5. The method according to claim 1, further comprising:

providing one or more clamping tool sets, wherein each clamping tool set comprises:

a first clamping tool having a first clamping head and being secured to the blade body adjacent to one of the attachment surfaces, and a second clamping tool having a second clamping head and being secured to the blade body adjacent to the other one of the attachment surfaces, wherein the applying the compression force is at least partly achieved by actuating the clamping tools of each clamping tool set to urge the clamping heads to apply the compression force onto the fairing.

6. The method according to claim 1, wherein the compression force is at least partly applied by inflating one or more bladders.

7. The method according to claim 1, further comprising:

providing one or more alignment tool sets, wherein each alignment tool sets comprises:

a first tool pair including a first jig tool part secured to one of the fairing lips or jig lips, and a first blade tool part secured to the blade body or a fixture lip adjacent to the corresponding attachment surface; and a second tool pair including a second jig tool part secured to the other fairing lip or jig lip, and a second blade tool part secured to the blade body or another fixture lip adjacent to the corresponding other attachment surface, respectively;

wherein one of the first jig tool part and the first blade tool part of each tool pair comprises a pin and the other one of the first jig tool part and the first blade tool part of each tool pair comprises a guide, the guide being configured for retaining the respective pin while allowing the pin to move along a pre-defined guide course from a pin entry position to a pin terminal position, wherein the arranging the fairing comprises inserting each pin in the respective guide to the pin entry position to bring the fairing to the first fairing state, each pin being retained in the respective guide, and wherein the applying the compression force causes each pin to move from the pin entry position to the pin terminal position of the respective guide.

8. The method according to claim 7, wherein the guide of each tool pair comprises a sloping section between a pin entry position and a first pin position, wherein the inserting each pin in the respective guide comprises sliding each pin along the sloping section of the respective guide from the pin entry position to the first pin position to gradually increase the expansion force on the jig lips.

9. The method according to claim 7, further comprising:

providing a fixture comprising a fixture profile terminating at a first fixture lip of the fixture and at a second fixture lip of the fixture; and securing the fixture on the exterior blade surface of the blade body so that the first fixture lip and the second fixture lip are positioned adjacent to the first attachment surface and the second attachment surface, respectively;

wherein the blade tool parts of the one or more alignment tool sets are fixed to the fixture thereby securing the blade tool parts to the blade body, and/or wherein the first clamping tool and/or the second clamping tool is/are fixed to the fixture thereby securing the clamping tool(s) to the blade body.

10. The method according to claim 1, wherein a difference between a first fairing lip distance and a second fairing lip distance is equal to or greater than 5 mm, the first fairing lip distance corresponding to a distance between the fairing lips when the fairing is in the first fairing state, and the second fairing lip distance corresponding to a distance between the fairing lips when the fairing is in the second fairing state, the first fairing lip distance being greater than the second fairing lip distance.

11. A kit of parts for assembly into a wind turbine blade extending along a longitudinal axis from a root to a tip, the wind turbine blade comprising a root region and an airfoil region with the tip, the wind turbine blade comprising a chord line extending between a leading edge and a trailing edge, the wind turbine blade comprising an aerodynamic exterior blade surface including a pressure side and a suction side, the kit of parts comprising:

a prefabricated structural blade body-comprising:

a first exterior body surface defining part of the pressure side, a second exterior body surface defining part of the suction side, a first attachment surface located adjacent to the first exterior body surface, and a second attachment surface located adjacent to the second exterior body surface;

a prefabricated fairing extending along the longitudinal axis and along a fairing profile terminating at a first fairing lip of the fairing and at a second fairing lip of the prefabricated fairing, the fairing comprising:

an exterior fairing surface positioned exteriorly relative to the fairing profile;

an interior fairing surface positioned interiorly relative to the fairing profile; and one or more fibre-reinforced layers extending from the first fairing lip to the second fairing lip and along the longitudinal axis;

wherein the prefabricated fairing is configured for being fixed to the blade body so that the exterior fairing surface defines a part of the exterior blade surface connecting the first exterior body surface and the second exterior body surface, and so that the exterior fairing surface defines either the leading edge of the wind turbine blade or the trailing edge of the wind turbine blade;

wherein the fairing has a first fairing state in which the fairing is adapted to be mounted to a blade body prior to being fixed and has a second fairing state in which the fairing is adapted to be fixed to the blade body, the fairing lips of the fairing being compressed towards each other in the second fairing state relative to the first fairing state, wherein the one or more fibre-reinforced layers of the fairing are configured for being deformed so that, upon application of a compression force onto the exterior fairing surface at fairing lips, the fairing is brought from the first fairing state to the second fairing state; and a jig extending along the longitudinal axis and along a jig profile terminating at a first jig lip of the jig and at a second jig lip of the jig, the jig comprising:

an interior jig surface positioned interiorly relative to the jig profile and configured to match and receive the exterior fairing surface of the fairing, wherein the jig has a first jig state and a second jig state, wherein the jig profile in the first jig state matches the fairing profile in the first fairing state and the jig profile in the second jig state matches the fairing profile in the second fairing state wherein the kit of parts further comprising one or more alignment tool sets each including:

a first tool pair including a first jig tool part and a first blade tool part secured to one of the fairing lips and to the blade body adjacent to the corresponding attachment surface, respectively; and a second tool pair including a second jig tool part and a second blade tool part secured to the other fairing lip and to the blade body adjacent to the corresponding other attachment surface, respectively;

wherein one of the tool parts of each tool pair comprises a pin and the other one of the tool parts of each tool pair comprises a guide configured for retaining the respective pin while allowing the pin to move along a predefined guide course from a pin entry position to a pin terminal position;

wherein each tool pair is configured so that, when the pin is positioned in the pin entry position in the respective guide, the fairing is in the first fairing state, and so that, when the pin has been moved from the pin entry position to the pin terminal position along the predefined guide course, the fairing is in the second fairing state.

12. The kit of parts according to claim 11, further comprising one or more clamping tool sets each comprising:

a first clamping tool having a first clamping head and configured for being secured to the blade body adjacent to one of the attachment surfaces; and a second clamping tool having a second clamping head and being secured to the blade body adjacent to the other one of the attachment surfaces;

wherein each clamping tool set is configured for actuating the clamping tools of each clamping tool set to urge the clamping heads to apply a compression force (Fc) onto the exterior fairing surface.

13. The kit of parts according to claim 11, wherein the jig comprises one or more bladders configured for, when being inflated, forcing the jig lips (62, 63) towards each other to bring the jig to the second jig state.

14. A wind turbine blade extending along a longitudinal axis from a root to a tip, the wind turbine blade comprising a root region and an airfoil region with the tip, the wind turbine blade comprising a chord line extending between a leading edge and a trailing edge thereof, the wind turbine blade comprising an aerodynamic exterior blade surface including a pressure side and a suction side, the wind turbine blade comprising:

a structural blade body; and a prefabricated fairing extending along the longitudinal axis and along a fairing profile terminating at a first fairing lip of the fairing and at a second fairing lip of the fairing, the fairing comprising:

an exterior fairing surface positioned exteriorly relative to the fairing profile;

an interior fairing surface positioned interiorly relative to the fairing profile; and one or more fibre-reinforced layers extending from the first fairing lip to the second fairing lip and along the longitudinal axis;

wherein the fairing has a relaxed fairing state in which the fairing profile assumes an unloaded shape, a first fairing state, has a second fairing state, wherein the fairing is mounted to the structural blade body in the first fairing state wherein the fairing is attached to the structural blade body in the second fairing state; and wherein the fairing lips of the fairing are expanded away from each other in the first and second fairing states relative to the relaxed fairing state.

15. The wind turbine blade according to claim 14, wherein the one or more fibre-reinforced layers forms part of a plurality of layers further including an exterior erosion-resistant elastomer layer forming at least a portion of the exterior fairing surface and being configured for defining the leading edge of the wind turbine blade, wherein the exterior erosion-resistant elastomer layer is made of polyurethane.

16. The wind turbine blade according to claim 14, further comprising a cured first resin binding an erosion-resistant elastomer layer and the one or more fibre-reinforced layers together.

* * * * *